United States Patent
Kawai et al.

(10) Patent No.: US 9,883,111 B2
(45) Date of Patent: Jan. 30, 2018

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Tomoyuki Kawai, Saitama (JP); Junji Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/200,811

(22) Filed: Jul. 1, 2016

(65) Prior Publication Data

US 2016/0316148 A1 Oct. 27, 2016

Related U.S. Application Data

(63) Continuation of application No. PCT/JP2014/078498, filed on Oct. 27, 2014.

(30) Foreign Application Priority Data

Jan. 27, 2014 (JP) .................................. 2014-012495

(51) Int. Cl.
*H04N 5/232* (2006.01)
*H04N 5/235* (2006.01)
(Continued)

(52) U.S. Cl.
CPC ........... *H04N 5/23293* (2013.01); *G02B 7/34* (2013.01); *G03B 13/36* (2013.01); *G03B 17/20* (2013.01);
(Continued)

(58) Field of Classification Search
None
See application file for complete search history.

(56) References Cited

U.S. PATENT DOCUMENTS

2004/0179128 A1 9/2004 Oikawa
2008/0084584 A1* 4/2008 Kauhanen .......... H04N 5/23212
358/3.27
(Continued)

FOREIGN PATENT DOCUMENTS

JP 2004-191629 A 7/2004
JP 2009-147665 A 7/2009
(Continued)

OTHER PUBLICATIONS

English Translation of International Preliminary Report on Patentability for PCT/JP2014/078498 (PCT/IPEA/409), dated Aug. 18, 2015.
(Continued)

*Primary Examiner* — Mark T Monk
(74) *Attorney, Agent, or Firm* — Birch, Stewart, Kolasch & Birch, LLP

(57) ABSTRACT

Provided are an image processing device, an imaging device, an image processing method, and an image processing program which can instantly switch display between a chromatic image indicating an in-focus state and an achromatic image indicating an out-of-focus state. A control unit performs control such that a chromatic split image, which is obtained by giving a chromatic color included in a normal image to an achromatic split image, is displayed in a case in which the result of comparison between an output value of a first image signal and an output value of a second image signal is less than a threshold value. In addition, the control unit performs control such that an achromatic split image, which is obtained based on a left eye image and a right eye image, is displayed in a case in which the comparison result is equal to or greater than the threshold value.

20 Claims, 23 Drawing Sheets

(51) Int. Cl.
    *H04N 5/369*     (2011.01)
    *H04N 9/04*     (2006.01)
    *G02B 7/34*     (2006.01)
    *G03B 13/36*     (2006.01)
    *G03B 17/20*     (2006.01)
    *H04N 5/243*     (2006.01)

(52) U.S. Cl.
    CPC ....... *H04N 5/2353* (2013.01); *H04N 5/23212* (2013.01); *H04N 5/243* (2013.01); *H04N 5/3696* (2013.01); *H04N 9/045* (2013.01)

(56) References Cited

U.S. PATENT DOCUMENTS

2009/0153693 A1     6/2009     Onuki et al.
2011/0267706 A1    11/2011    Karasawa

FOREIGN PATENT DOCUMENTS

JP     2011-232684 A     11/2011
JP     2012-145840 A      8/2012

OTHER PUBLICATIONS

International Preliminary Examination Report for PCT/JP2014/078498 (PCT/IPEA/409) completed on Aug. 18, 2015.
International Search Report for PCT/JP2014/078498 (PCT/ISA/210) dated Feb. 3, 2015.
Written Opinion of the International Searching Authority for PCT/JP2014/078498 (PCT/ISA/237) dated Feb. 2, 2015.

* cited by examiner

FIG. 15

| | Y | Cr | Y | Cb | Y | Cr | Y | Cb | | | |
|---|---|---|---|---|---|---|---|---|---|---|---|
| NORMAL IMAGE | $Y_0[1]$ | $Cr_0[1]$ | $Y_0[2]$ | $Cb_0[2]$ | $Y_0[3]$ | $Cr_0[3]$ | $Y_0[4]$ | $Cb_0[4]$ | ... | ... | ... |
| SPLIT IMAGE | $Y_1[1]$ | 0 | $Y_1[2]$ | 0 | $Y_1[3]$ | 0 | $Y_1[4]$ | 0 | ... | ... | ... |

FIG. 16

| | Y | Cr | Y | Cb | Y | Cr | Y | Cb | ... |
|---|---|---|---|---|---|---|---|---|---|
| NORMAL IMAGE | $Y_0[1]$ | $Cr_0[1]$ | $Y_0[2]$ | $Cb_0[2]$ | $Y_0[3]$ | $Cr_0[3]$ | $Y_0[4]$ | $Cb_0[4]$ | ... |
| SPLIT IMAGE | $Y_1[1]$ | $Cr_1[1]$ | $Y_1[2]$ | $Cb_1[2]$ | $Y_1[3]$ | $Cr_1[3]$ | $Y_1[4]$ | $Cb_1[4]$ | ... |

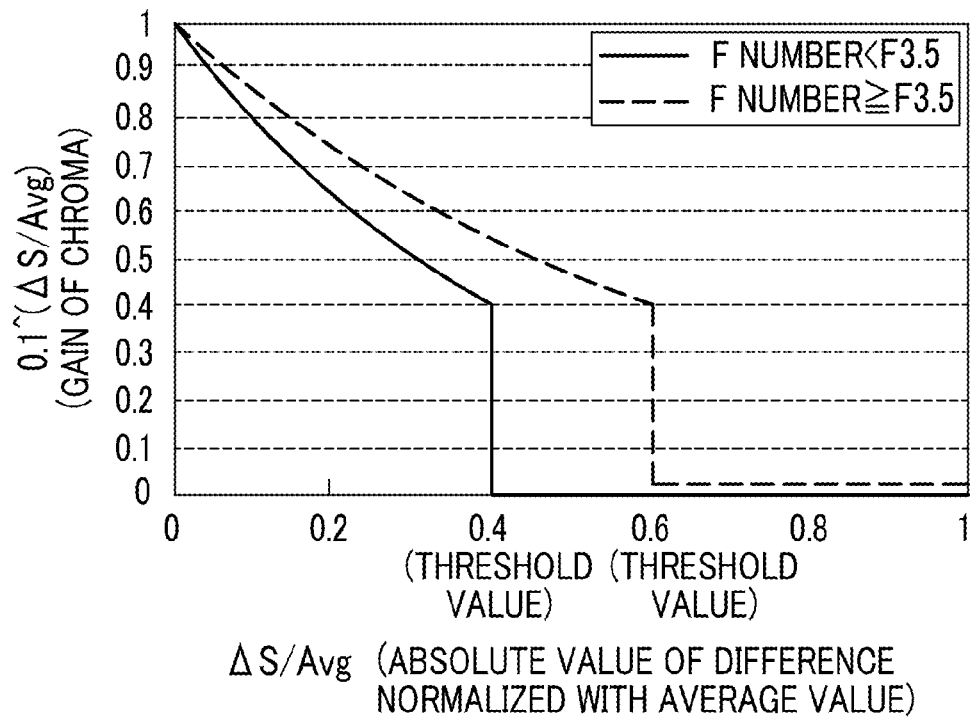
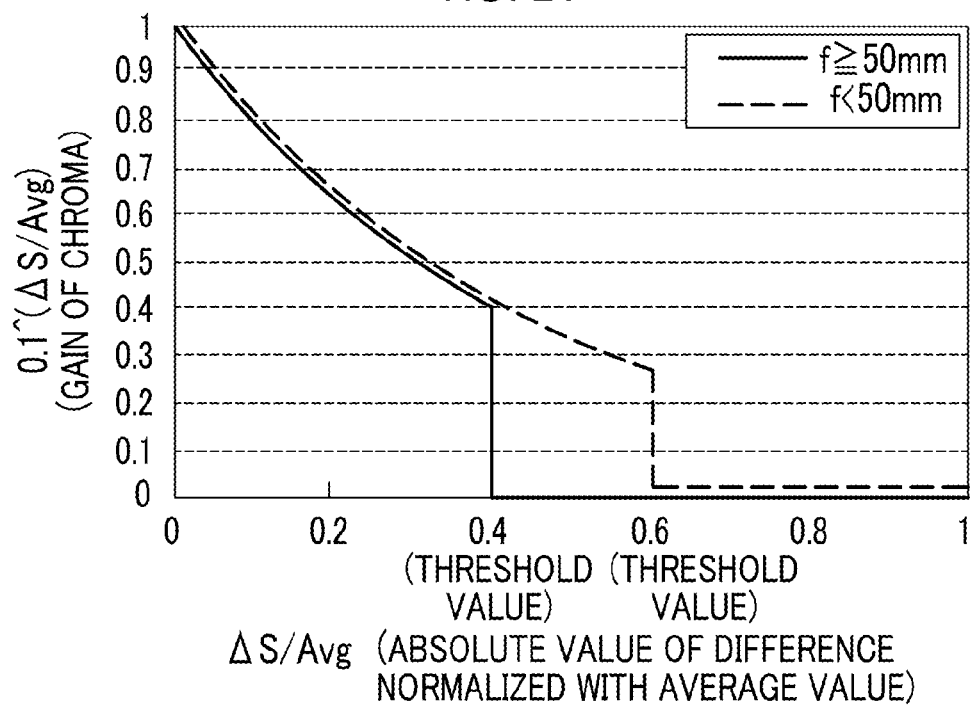

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2014/078498 filed on Oct. 27, 2014, which claims priority under 35 U.S.C § 119(a) to Japanese Patent Application No. 2014-012495 filed on Jan. 27, 2014. Each of the above application(s) is hereby expressly incorporated by reference, in its entirety, into the present application.

BACKGROUND OF THE INVENTION

1. Field of the Invention

The present invention relates to an image processing device, an imaging device, an image processing method, and a non-transitory computer readable recording medium recorded with an image processing program.

2. Description of the Related Art

Digital cameras which have a so-called manual focus mode that enables the user to manually adjust focus, in addition to an automatic focus using a phase difference detection method or a contrast detection method, have come into widespread use.

As a digital camera having a manual focus mode, a digital camera is known which is provided with a reflex mirror such that the user can adjust focus while checking an object and uses a split microprism screen on which a phase difference is visually displayed. In addition, a digital camera using a method which visually checks contrast is known.

However, in a digital camera without a reflex mirror, which has recently come into widespread use, since a reflex mirror is not provided, there is no way to check an object image while displaying a phase difference and there is no choice but to use the contrast detection method. However, in this case, it is difficult to display an image with a contrast that is equal to or greater than the resolution of a display device such as a liquid crystal display (LCD). As a result, there is no choice but to use a method which partially enlarges an image and displays the image.

In recent years, a split image has been displayed in a live view image (also referred to as a through image) in order to make it easy for the user (for example, the photographer) to focus the camera on the object in the manual focus mode. The split image indicates, for example, a divided image (for example, each of the images which are divided in the up-down direction) in which the display region is divided into a plurality of regions and which deviates in a direction in which parallax occurs (for example, the left-right direction) depending on the amount of defocus. In a state in which an image is in focus, the deviation of the split image in the direction in which parallax occurs is removed. The user operates a manual focus ring (hereinafter, referred to as a "focus ring") to focus the camera on the object such that the deviation of the split image (for example, each of the images which are divided in the up-down direction) is removed.

Here, the principle of the split image will be described. An object image which passes through a pair of regions of an imaging lens is pupil-divided and formed and a so-called right eye image and a so-called left eye image are generated. Then, a split image is generated, using the right eye image and the left eye image. In addition, an object image which passes through the imaging lens is formed, without being pupil-divided, and a normal image is generated. Then, the normal image is displayed on a display unit and the split image is displayed in the normal image.

However, various techniques are known which enable the user to check whether an image is in focus. For example, an imaging device disclosed in JP2009-147665A displays a split image and gives the color information of a normal image to the split image in a case in which a phase difference satisfies a predetermined condition. Therefore, it is easy to visually recognize a display image indicating an in-focus state and a display image indicating an out-of-focus state.

SUMMARY OF THE INVENTION

However, since a process for calculating a phase difference is complicated, it is difficult to instantly perform a process for giving color information to a split image and a process for removing color information from a split image.

The invention has been made in view of the above-mentioned problems and an object of the invention is to provide an image processing device, an imaging device, an image processing method, and a non-transitory computer readable recording medium recorded with an image processing program which can instantly switch display between a chromatic image indicating an in-focus state and an achromatic image indicating an out-of-focus state.

In order to achieve the object, an image processing device according to a first aspect of the invention includes: generation unit that generates a first achromatic image based on a first image signal which is output from an imaging element including first and second pixel groups on which an object image that passes through first and second regions of an imaging lens and is pupil-divided is formed and which output the first image signal and a second image signal, respectively, and a third pixel group on which the object image that passes through the imaging lens and is formed, without being pupil-divided, and which outputs a third image signal, a second achromatic image based on the second image signal that is output from the imaging element, and a third chromatic image based on the third image signal that is output from the imaging element; a display unit that displays an image; and a control unit that performs control such that the display unit displays a chromatic image, which is obtained by giving a chromatic color included in the third image at a position corresponding to the first pixel to a position of the first pixel in the first image and giving a chromatic color included in the third image at a position corresponding to the second pixel to a position of the second pixel in the second image and is used to check a focus, in a case in which a result of comparison between an output value of the first image signal output from a first pixel included in the first pixel group and an output value of the second image signal output from a second pixel corresponding to the first pixel and included in the second pixel group is less than a threshold value and performs control such that the display unit displays an achromatic image, which is obtained on the basis of the first image at a position corresponding to the first pixel and the second image at a position corresponding to the second pixel and is used to check a focus, in a case in which the comparison result is equal to or greater than the threshold value. Therefore, the image processing device can instantly switch display between a chromatic image indicating an in-focus state and an achromatic image indicating an out-of-focus state, as compared to a case in which a phase difference used to determine whether an image is in focus is calculated.

According to a second aspect of the invention, in the image processing device according to the first aspect of the invention, the control unit performs control such that the display unit displays the third image and selectively displays the chromatic image and the achromatic image in a display region of the third image. Therefore, the image processing device enables a user to visually recognize whether an image is in focus with ease, as compared to a case in which the chromatic image and the achromatic image are not selectively displayed in the display region of the third image.

According to a third aspect of the invention, in the image processing device according to the first aspect or the second aspect of the invention, the comparison result is a value that is based on at least one of a difference or a ratio between the output value of the first image signal and the output value of the second image signal. Therefore, the image processing device can reduce a processing load required to determine whether an image is in focus, as compared to a case in which the value based on at least one of the difference or the ratio between the output value of the first image signal and the output value of the second image signal is not used as the comparison result.

According to a fourth aspect of the invention, in the image processing device according to the third aspect of the invention, the comparison result is an absolute value of the difference. Therefore, the image processing device can determine whether an image is in focus with high accuracy, as compared to a case in which the absolute value of the difference is not used as the comparison result.

According to a fifth aspect of the invention, in the image processing device according to the third aspect of the invention, the comparison result is a value obtained by normalizing an absolute value of the difference. Therefore, the image processing device can determine whether an image is in focus with high accuracy, as compared to a case in which the value obtained by normalizing the absolute value of the difference is not used as the comparison result.

According to a sixth aspect of the invention, in the image processing device according to the third aspect of the invention, the comparison result is a degree of deviation of a ratio of one of the output value of the first image signal and the output value of the second image signal to the other output value from a reference value. Therefore, the image processing device can determine whether an image is in focus with high accuracy, as compared to a case in which the degree of deviation of the ratio of one of the output value of the first image signal and the output value of the second image signal to the other output value from the reference value is not used as the comparison result.

According to a seventh aspect of the invention, in the image processing device according to any one of the first to sixth aspects of the invention, the threshold value is determined according to imaging conditions. Therefore, the image processing device can achieve a balance between the frequency of displaying a chromatic color and the frequency of displaying an achromatic color, as compared to a case in which the threshold value is not determined according to the imaging conditions.

According to an eighth aspect of the invention, in the image processing device according to the seventh aspect of the invention, the imaging conditions are a diaphragm value, and the threshold value decreases as the diaphragm value decreases. Therefore, the image processing device can balance the frequency of displaying a chromatic color with the frequency of displaying an achromatic color according to the depth of field, as compared to a case in which the threshold value does not decrease as the diaphragm value decreases.

According to a ninth aspect of the invention, in the image processing device according to the seventh aspect of the invention, the imaging conditions are a focal length, and the threshold value decreases as the focal length increases. Therefore, the image processing device can balance the frequency of displaying a chromatic color with the frequency of displaying an achromatic color according to the depth of field, as compared to a case in which the threshold value does not decrease as the focal length increases.

According to a tenth aspect of the invention, in the image processing device according to the seventh aspect of the invention, the imaging conditions are an exposure time, and the threshold value decreases as the exposure time increases. Therefore, the image processing device can balance the frequency of displaying a chromatic color with the frequency of displaying an achromatic color according to the amount of noise caused by the exposure time, as compared to a case in which the threshold value does not decrease as the exposure time increases.

According to an eleventh aspect of the invention, in the image processing device according to the seventh aspect of the invention, the imaging conditions are the gain of the imaging element and the threshold value decreases as the gain increases. Therefore, the image processing device can balance the frequency of displaying a chromatic color with the frequency of displaying an achromatic color according to the amount of noise based on the gain, as compared to a case in which the threshold value does not decrease as the gain increases.

According to a twelfth aspect of the invention, in the image processing device according to any one of the first to eleventh aspects of the invention, the comparison result is a result of comparison between the output value of the first image signal and the output value of the second image signal, of which shading characteristics have been corrected on the basis of a correction coefficient corresponding to the shading characteristics based on light that is incident through the first region and light that is incident through the second region. Therefore, the image processing device can determine whether an image is in focus with high accuracy, as compared to a case in which the shading characteristics of the output value of the first image signal and the output value of the second image signal are not corrected.

According to a thirteenth aspect of the invention, in the image processing device according to any one of the first to twelfth aspects of the invention, the comparison result is a result of comparison between the output value of the first image signal and the output value of the second image signal, which are output from the first pixel and the second pixel that are arranged in a direction intersecting a pupil division direction. Therefore, the image processing device can determine whether an image is in focus with high accuracy, as compared to a case in which the result of comparison between the output value of the first image signal and the output value of the second image signal from the pixels that are arranged in a direction intersecting the pupil division direction is not used.

According to a fourteenth aspect of the invention, in the image processing device according to any one of the first to thirteenth aspects of the invention, the comparison result is a result of comparison between the output value of the first image signal output from the first pixel included in the first pixel group and the output value of the second image signal output from the second pixel corresponding to the first pixel and included in the second pixel group in each of a plurality of divided pixel groups obtained by dividing a pixel group including the first and second pixel groups. Therefore, the image processing device can determine whether an image is in focus with high accuracy, as compared to a case in which the result of comparison between the output value of the first image signal and the output value of the second image signal in each of the divided pixel groups is not used.

According to a fifteenth aspect of the invention, in the image processing device according to any one of the first to fifteenth aspects of the invention, the control unit performs control such that chroma is given from the third image at a position corresponding to the first pixel to a position of the first pixel in the first image and chroma is given from the third image at a position corresponding to the second pixel to a position of the second pixel in the second image to thereby give a chromatic color to the first and second images in a case in which the comparison result is less than the threshold value. Therefore, the image processing device can generate a chromatic image with a simple structure, as compared to a case in which chroma is not given from the third image to the first and second images in a case in which the comparison result is less than the threshold value.

According to a sixteenth aspect of the invention, in the image processing device according to any one of the first to sixteenth aspects of the invention, the intensity of the chromatic color which is given to the first and second images in a case in which the comparison result is less than the threshold value increases as the degree of deviation of the comparison result from the threshold value increases. Therefore, the image processing device can achieve a slow change in color in a region between the chromatic image and the achromatic image, as compared to a case in which the intensity of the chromatic color does not increase as the degree of deviation of the comparison result from the threshold value increases.

In order to achieve the object, an imaging device according to an seventeenth aspect of the invention includes: the image processing device according to any one of the first to seventeenth aspects; an imaging element including the first pixel group, the second pixel group, and the third pixel group; and a storage unit that stores an image which is generated on the basis of a signal output from the imaging element. Therefore, the image device can instantly switch display between a chromatic image indicating an in-focus state and an achromatic image indicating an out-of-focus state, as compared to a case in which a phase difference used to determine whether an image is in focus is calculated.

In order to achieve the object, an image processing method according to a eighteenth aspect of the invention includes: providing the image processing device; generating the first achromatic image based on the first image signal which is output from the imaging element including first and second pixel groups on which the object image that passes through first and second regions of the imaging lens and is pupil-divided is formed and which output the first image signal and the second image signal, respectively, and the third pixel group on which the object image that passes through the imaging lens and is formed, without being pupil-divided, and which outputs the third image signal, the second achromatic image based on the second image signal that is output from the imaging element, and the third chromatic image based on the third image signal that is output from the imaging element; and performing control such that the display unit which displays the image displays the chromatic image, which is obtained by giving the chromatic color included in the third image at the position corresponding to the first pixel to the position of the first pixel in the first image and giving the chromatic color included in the third image at the position corresponding to the second pixel to the position of the second pixel in the second image and is used to check the focus, in the case in which the result of comparison between the output value of the first image signal output from the first pixel included in the first pixel group and the output value of the second image signal output from the second pixel corresponding to the first pixel and included in the second pixel group is less than the threshold value and performing control such that the display unit displays the achromatic image, which is obtained on the basis of the first image at the position corresponding to the first pixel and the second image at the position corresponding to the second pixel and is used to check the focus, in the case in which the comparison result is equal to or greater than the threshold value. Therefore, the image processing method can instantly switch display between a chromatic image indicating an in-focus state and an achromatic image indicating an out-of-focus state, as compared to a case in which a phase difference used to determine whether an image is in focus is calculated.

In order to achieve the object, a non-transitory computer readable recording medium recorded with an image processing program according to a nineteenth aspect of the invention causes a computer to perform a process for functioning as the image processing device including: generating the first achromatic image based on the first image signal which is output from the imaging element including first and second pixel groups on which the object image that passes through first and second regions of the imaging lens and is pupil-divided is formed and which output the first image signal and the second image signal, respectively, and the third pixel group on which the object image that passes through the imaging lens and is formed, without being pupil-divided, and which outputs the third image signal, the second achromatic image based on the second image signal that is output from the imaging element, and the third chromatic image based on the third image signal that is output from the imaging element; and performing control such that the display unit which displays the image displays the chromatic image, which is obtained by giving the chromatic color included in the third image at the position corresponding to the first pixel to the position of the first pixel in the first image and giving the chromatic color included in the third image at the position corresponding to the second pixel to the position of the second pixel in the second image and is used to check the focus, in the case in which the result of comparison between the output value of the first image signal output from the first pixel included in the first pixel group and the output value of the second image signal output from the second pixel corresponding to the first pixel and included in the second pixel group is less than the threshold value and performing control such that the display unit displays the achromatic image, which is obtained on the basis of the first image at the position corresponding to the first pixel and the second image at the position corresponding to the second pixel and is used to check the focus, in the case in which the comparison result is equal to or greater than the threshold value. Therefore, the non-transitory computer readable recording medium recorded with the image processing program can instantly switch display between a chromatic image indicating an in-focus state and an achromatic image indicating an out-of-focus state, as compared to a case in which a phase difference used to determine whether an image is in focus is calculated.

According to the invention, it is possible to instantly switch display between a chromatic image indicating an in-focus state and an achromatic image indicating an outof-focus state, as compared to a case in which a phase difference used to determine whether an image is in focus is calculated.

BRIEF DESCRIPTION OF THE DRAWINGS

FIG. 15 is a diagram schematically illustrating an example of a correspondence relationship between a brightness signal and a color difference signal of a normal image and a brightness signal and a color difference signal of a split image before color information is given in a memory.

FIG. 16 is a diagram schematically illustrating an example of a correspondence relationship between a brightness signal and a color difference signal of a normal image and a brightness signal and a color difference signal of a split image after color information is given in the memory.

FIG. 20 is a graph illustrating another example of the correspondence relationship between the normalized difference absolute value and the gain multiplied by the chroma of the normal image in a case in which the F number is less than 3.5 and a case in which the F number is equal to or greater than 3.5.

FIG. 21 is a graph illustrating an example of a correspondence relationship between a normalized difference absolute value and a gain multiplied by the chroma of a normal image in a case in which a focal length is less than 50 millimeters and a case in which the focal length is equal to or greater than 50 millimeters.

DESCRIPTION OF THE PREFERRED EMBODIMENTS

Hereinafter, an example of an embodiment of an imaging device according to the invention will be described with reference to the accompanying drawings.

First Embodiment

Figure 1:
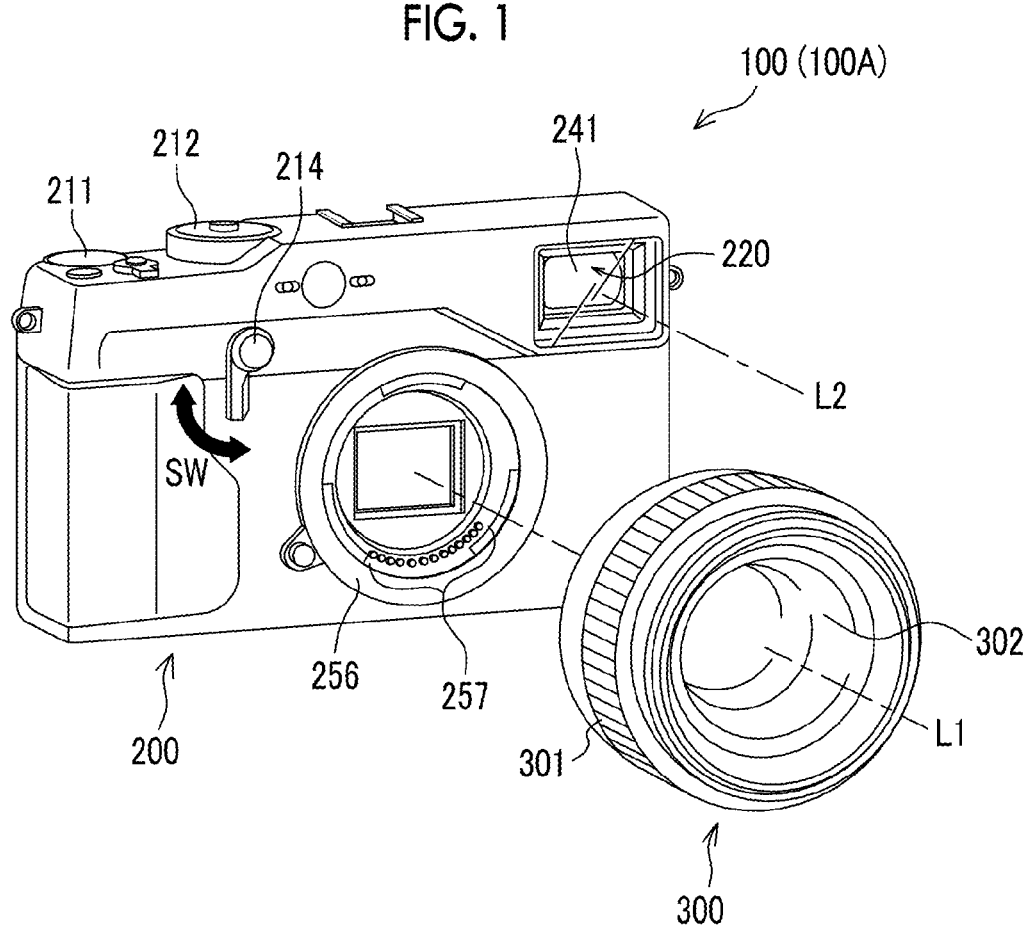
FIG. 1 is a perspective view illustrating an example of the outward appearance of an imaging device which is an interchangeable lens camera according to first and second embodiments.
Figure 2:
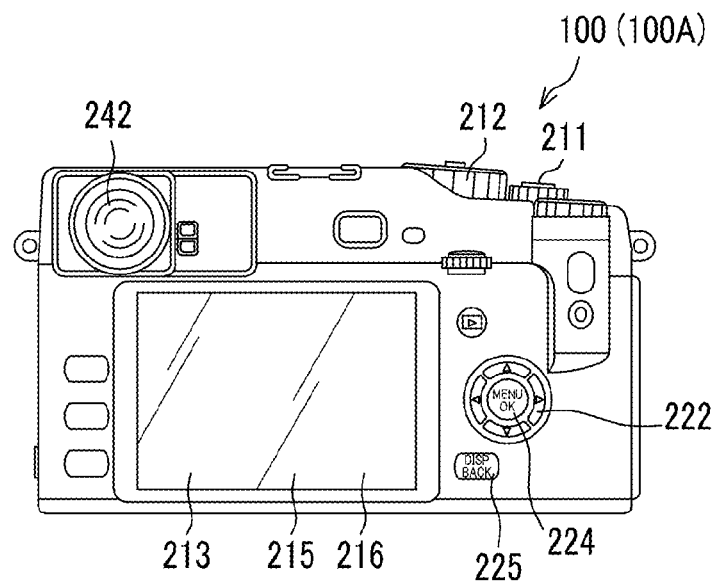
FIG. 2 is a rear view illustrating a rear surface side of the imaging device according to the first and second embodiments.

FIG. 1 is a perspective view illustrating an example of the outward appearance of an imaging device 100 according to a first embodiment. FIG. 2 is a rear view illustrating the imaging device 100 illustrated in FIG. 1.

The imaging device 100 is an interchangeable lens camera. The imaging device 100 is a digital camera that includes an imaging device body 200 and an interchangeable lens 300 which is interchangeably mounted on the imaging device body 200, and does not include a reflex mirror. The interchangeable lens 300 includes an imaging lens 16 (see FIG. 3) having a focus lens 302 that can be moved in an optical axis direction by a manual operation. In addition, imaging device body 200 includes a hybrid finder (registered trademark) 220. The hybrid finder 220 means, for example, a finder in which an optical viewfinder (hereinafter, referred to as an "OVF") and an electronic viewfinder (hereinafter, referred to as an "EVF") are selectively used.

The interchangeable lens 300 is interchangeably mounted on the imaging device body 200. In addition, a focus ring 301 which is used in a manual focus mode is provided in a lens barrel of the interchangeable lens 300. The focus lens 302 is moved in the optical axis direction with the rotation of the focus ring 301 by a manual operation to focus object light on an imaging element 20 (see FIG. 3), which will be described below, at an in-focus position corresponding to the distance to the object.

A finder window 241 of the OVF included in the hybrid finder 220 is provided on the front surface of the imaging device body 200. In addition, a finder switching lever 214 (finder switching unit) is provided on the front surface of the imaging device body 200. When the finder switching lever 214 is rotated in the direction of an arrow SW, an image is switched between an optical image which can be viewed through the OVF and an electronic image (live view image) which can be viewed through the EVF (which will be described below). Further, an optical axis L2 of the OVF is different from an optical axis L1 of the interchangeable lens 300. Furthermore, a release button 211 and a dial 212 for setting, for example, an imaging mode or a playback mode are generally provided on an upper surface of the imaging device body 200.

The release button 211 serving as an imaging preparation instruction unit and an imaging instruction unit is configured such that a two-stage pressing operation, that is, an imaging preparation instruction state and an imaging instruction state can be detected. The imaging preparation instruction state means a state in which the release button 211 is pressed from a standby position to an intermediate position (halfway pressed position). The imaging instruction state means a state in which the release button 211 is pressed to a finally pressed position (fully pressed position) through the intermediate position. Hereinafter, the "state in which the release button 211 is pressed from the standby position to the halfway pressed position" is referred to as a "halfway pressed state" and the "state in which the release button 211 is pressed from the standby position to the fully pressed position" is referred to as a "fully pressed state".

In the imaging device 100 according to the first embodiment, the imaging mode and the playback mode as the operation modes are selectively set in response to an instruction from the user. In the imaging mode, the manual focus mode and the automatic focus mode are selectively set in response to an instruction from the user. In the automatic focus mode, the state of the release button 211 is changed to the halfway pressed state to adjust imaging conditions, and is then changed to the fully pressed state to perform exposure (imaging). That is, when the release button 211 is pressed halfway, an automatic exposure (AE) function is performed to set an exposure state. Then, an auto-focus (AF) function is performed to perform focusing control. When the release button 211 is fully pressed, imaging is performed.

A touch panel display 213, a cross key 222, a MENU/OK key 224, a BACK/DISP button 225, and a finder eyepiece 242 of the OVF are provided on the rear surface of the imaging device body 200 illustrated in FIG. 2.

The touch panel display 213 comprises a liquid crystal display (hereinafter, referred to as a "first display") 215 and a touch panel 216.

The first display 215 displays, for example, an image and text information. The first display 215 is used to display a live view image (through image) which is an example of a continuous frame image captured in continuous frames in the imaging mode. In addition, the first display 215 is used to display a still image which is an example of a single frame image that is captured in a single frame in a case in which an instruction to capture a still image is issued. The first display 215 is also used to display a reproduction image in the playback mode or to display, for example, a menu screen.

The touch panel 216 is a transmissive touch panel and is superimposed on the surface of a display region of the first display 215. The touch panel 216 detects the contact of an indicator (for example, a finger or a stylus pen). The touch panel 216 outputs detection result information indicating the detection result (indicating whether the indicator comes into contact with the touch panel 216) to a predetermined output destination (for example, a CPU 12 (see FIG. 3) which will be described below) in a predetermined cycle (for example, 100 milliseconds). In a case in which the touch panel 216 detects the contact of the indicator, the detection result information includes two-dimensional coordinates (hereinafter, referred to as "coordinates") which can specify the contact position on the indicator on the touch panel 216. In a case in which the touch panel 216 does not detect the contact of the indicator, the detection result information does not include the coordinates.

The cross key 222 functions as a multi-function key which is used to select one or more menu items and to output various kinds of command signals, such as a zoom signal and a frame advance signal. The MENU/OK key 224 is an operation key having both the function of a menu button for issuing a command to display one or more menus on a screen of the first display 215 and the function of an OK button for issuing a command to confirm and execute the selected content. For example, the BACK/DISP button 225 is used to delete a desired target, such as a selected item, to cancel the designated content, or to return to the previous operation state.

Figure 3:
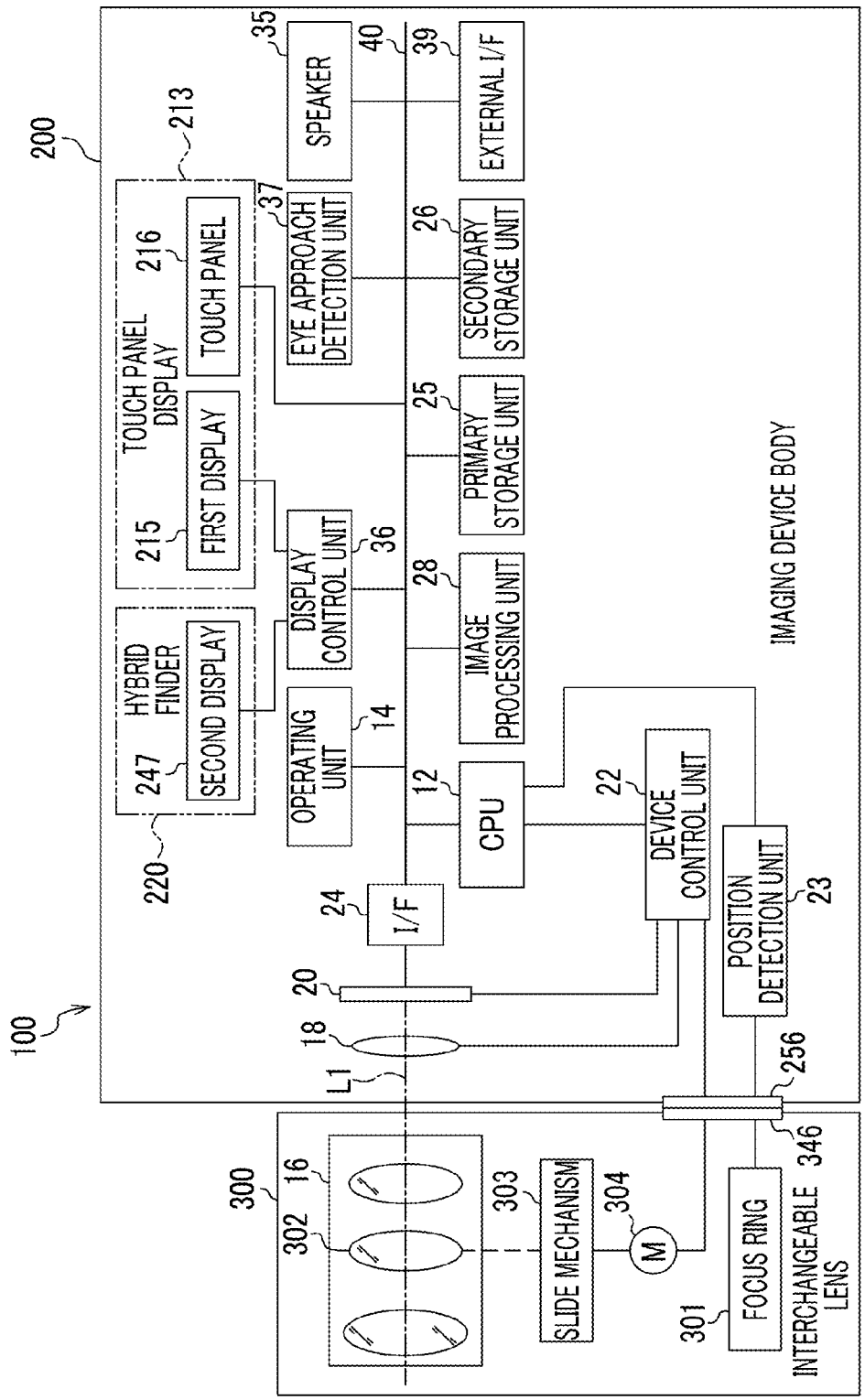
FIG. 3 is a block diagram illustrating an example of the hardware configuration of the imaging device according to the first and second embodiments.

FIG. 3 is an electric system block diagram illustrating an example of the hardware configuration of the imaging device 100 according to the first embodiment.

The imaging device 100 includes a mount 256 which is comprised in the imaging device body 200 and a mount 346 which is provided in the interchangeable lens 300 and corresponds to the mount 256. The mount 346 is coupled to the mount 256 such that the interchangeable lens 300 is interchangeably mounted on the imaging device body 200.

The interchangeable lens 300 includes a slide mechanism 303 and a motor 304. The slide mechanism 303 moves the focus lens 302 along the optical axis L1 when the focus ring 301 is operated. The focus lens 302 is attached to the slide mechanism 303 so as to be slidable along the optical axis L1. In addition, the motor 304 is connected to the slide mechanism 303 and the slide mechanism 303 is driven by the motor 304 to slide the focus lens 302 along the optical axis L1.

The motor 304 is connected to the imaging device body 200 through the mounts 256 and 346 and the driving of the motor 304 is controlled in response to a command from the imaging device body 200. In the first embodiment, a stepping motor is applied as an example of the motor 304. The motor 304 is operated in synchronization with pulse power in response to a command from the imaging device body 200. In the example illustrated in FIG. 3, the motor 304 is provided in the interchangeable lens 300. However, the invention is not limited thereto. The motor 304 may be provided in the imaging device body 200.

The imaging device 100 is a digital camera that records captured still images and moving images. The overall operation of the camera is controlled by the central processing unit (CPU) 12. The imaging device 100 includes an operating unit 14, an interface unit 24, a primary storage unit 25, a secondary storage unit 26, an image processing unit 28, a speaker 35, a display control unit 36, an eye approach detection unit 37, and an external interface (I/F) 39.

The CPU 12, the operating unit 14, the interface unit 24, the primary storage unit 25, the secondary storage unit 26, the image processing unit 28, the speaker 35, the display control unit 36, the eye approach detection unit 37, the external I/F 39, and the touch panel 216 are connected to each other through a bus 40.

The primary storage unit 25 means a volatile memory and is, for example, a random access memory (RAM). The secondary storage unit 26 means a non-volatile memory and is, for example, a flash memory or a hard disk drive (HDD).

In the imaging device 100 according to the first embodiment, in the automatic focus mode, the CPU 12 controls the driving of the motor 304 such that the contrast value of a captured image is the maximum to perform focus control. In addition, in the automatic focus mode, the CPU 12 calculates AE information which is a physical amount indicating the brightness of the captured image. When the release button 211 is in the halfway pressed state, the CPU 12 calculates a shutter speed and an F number corresponding to the brightness of the image indicated by the AE information. Then, the CPU 12 controls each related unit such that the shutter speed and the F number become the calculated values to set an exposure state.

The operating unit 14 is a user interface which is operated by the user to input various instructions to the imaging device 100. The operating unit 14 includes the release button 211, the dial 212 for selecting, for example, the imaging mode, the finder switching lever 214, the cross key 222, the MENU/OK key 224, and the BACK/DISP button 225. Various instructions received by the operating unit 14 are output as operation signals to the CPU 12. The CPU 12 performs processes corresponding to the operation signals input from the operating unit 14.

The imaging device body 200 includes a position detection unit 23. The position detection unit 23 is connected to the CPU 12. The position detection unit 23 is connected to the focus ring 301 through the mounts 256 and 346, detects the rotation angle of the focus ring 301, and outputs rotation angle information indicating the detected rotation angle to the CPU 12. The CPU 12 performs a process corresponding to the rotation angle information input from the position detection unit 23.

When the imaging mode is set, image light indicating the object is focused on a light receiving surface of a color imaging element (for example, a CMOS sensor) 20 through the imaging lens 16 including a focus lens 302 which can be moved by a manual operation and a shutter 18. The signal charge stored in the imaging element 20 is sequentially read as a digital signal corresponding to the signal charge (voltage) by a read signal supplied from a device control unit 22. The imaging element 20 has a so-called electronic shutter function and performs the electronic shutter function to control the charge storage time (shutter speed) of each photo sensor on the basis of the timing of the read signal. The imaging element 20 according to the first embodiment is a CMOS image sensor, but is not limited thereto. For example, the imaging element 20 may be a CCD image sensor.

Figure 4:
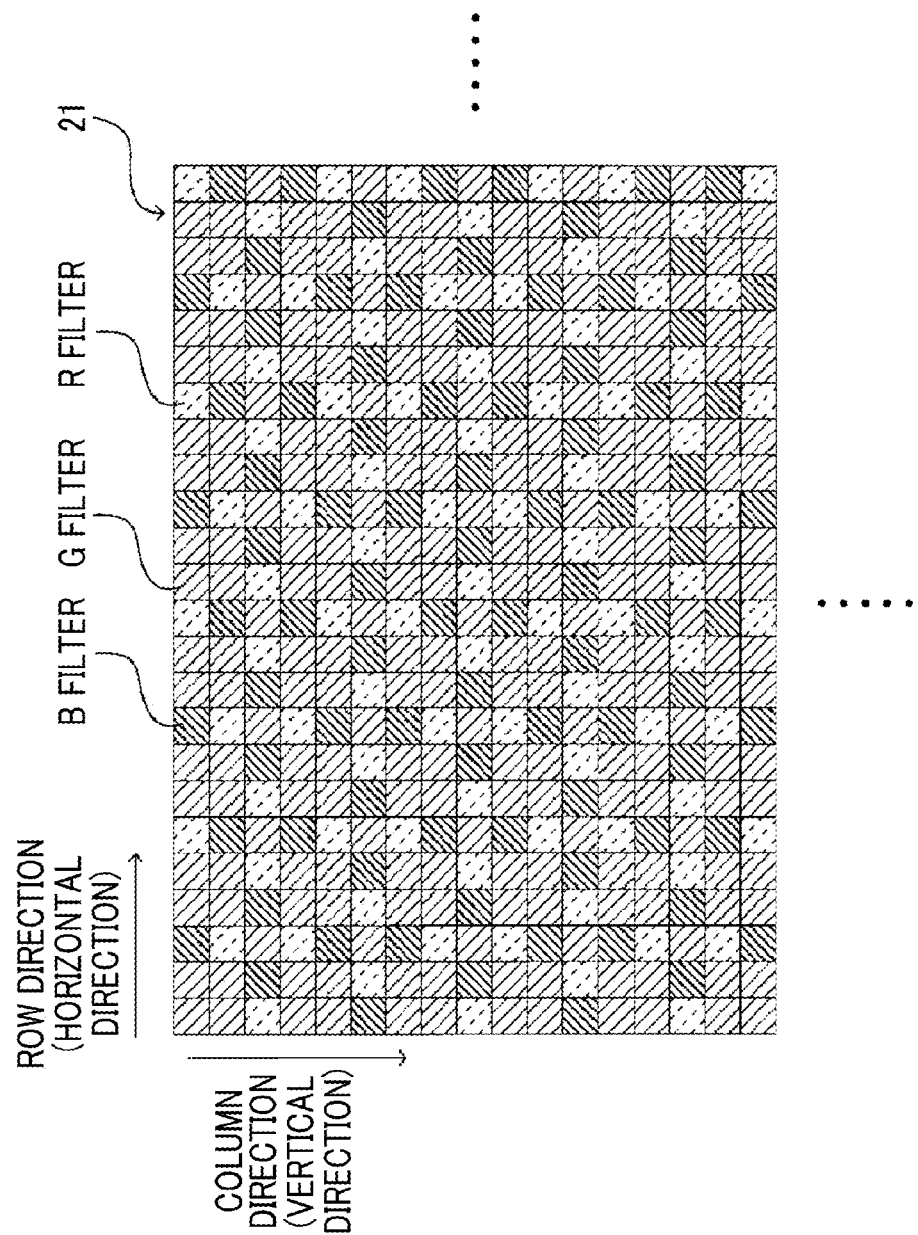
FIG. 4 is a diagram schematically illustrating an example of the structure of color filters provided in an imaging element of the imaging device according to the first embodiment.

For example, the imaging element 20 comprises the color filter 21 illustrated in FIG. 4. The color filter 21 includes a G filter corresponding to green (G) which most contributes to obtaining a brightness signal, an R filter corresponding to red (R), and a B filter corresponding to blue (B). In the example illustrated in FIG. 5, the imaging element 20 has, for example, "4896×3265" pixels. The G filter, the R filter, and the B filter are arranged for each of the pixels so as to have predetermined periodicity in the row direction (horizontal direction) and the column direction (vertical direction). Therefore, when performing a synchronization (interpolation) process for R, and B signals, the imaging device 100 can perform the process according to a repetitive pattern. The synchronization process is a process which calculates the information of all colors for each pixel from a mosaic image corresponding to a color filter array of a single-plate color imaging element. For example, in the case of an imaging element including three color filters, that is, R, and B filters, the synchronization process means a process which calculates the color information of all of R, and B for each pixel from a mosaic image including R, and B.

Figure 5:
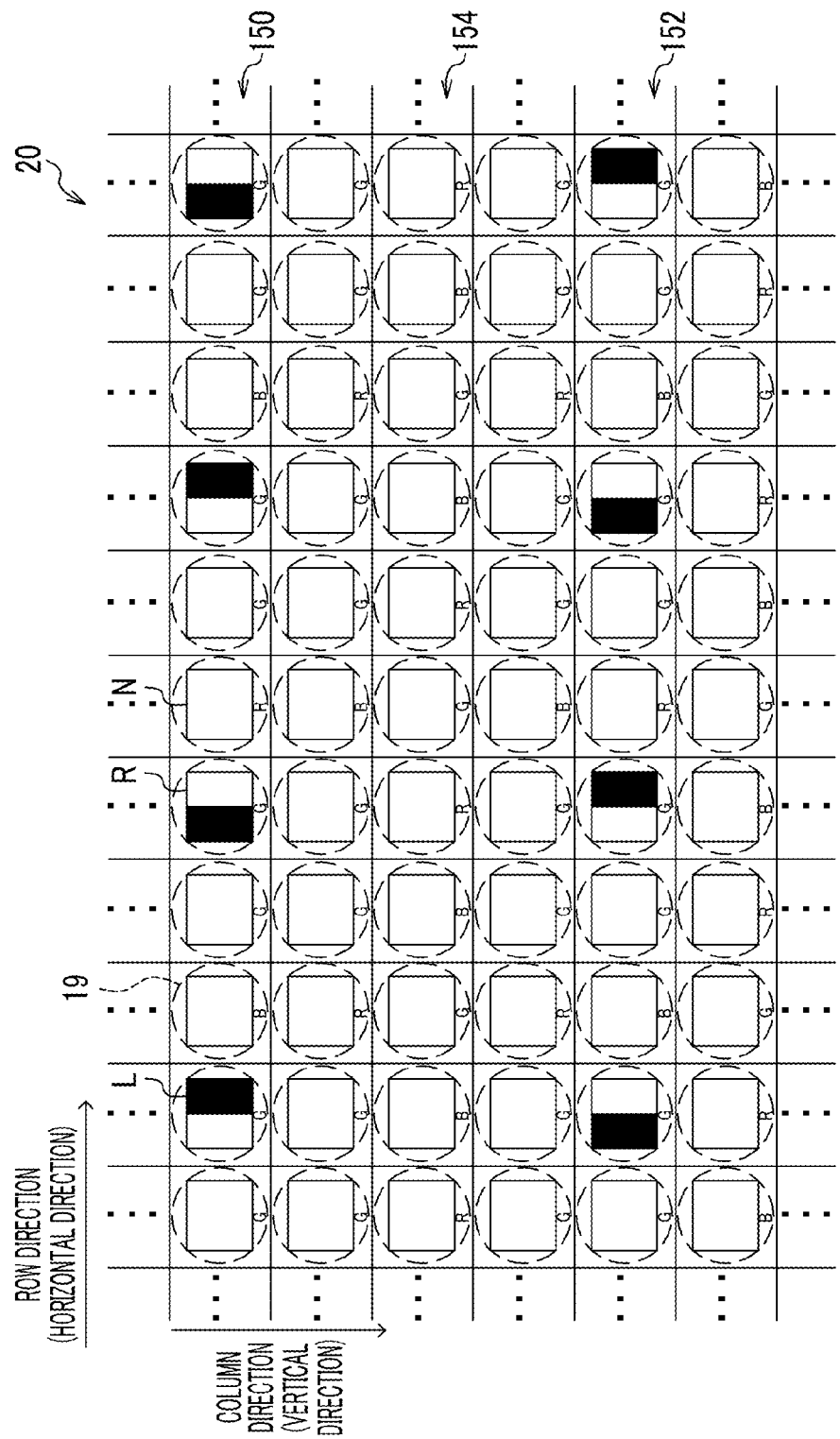
FIG. 5 is a diagram schematically illustrating an example of the arrangement of normal pixels, first pixels, and second pixels and an example of the arrangement of the colors of the color filters allocated to the normal pixels, the first pixels, and the second pixels in the imaging element of the imaging device according to the first embodiment.

For example, as illustrated in FIG. 5, the imaging element 20 includes a first pixel L, a second pixel R, and a normal pixel N which will be described below. A microlens 19 is provided in each of the first pixel L, the second pixel R, and the normal pixel N. Light which passes through the microlens 19 is received by the first pixel L, the second pixel R, and the normal pixel N and is then photoelectrically converted. Any one of the "R", "G", and "B" filters included in the color filter 21 is allocated to each pixel of the imaging element 20. In the example illustrated in FIG. 5, "R" written in the pixel indicates the R filter, "G" written in the pixel indicates the G filter, and "B" written in the pixel indicates the B filter.

The imaging element 20 includes a first pixel row 150, a second pixel row 152, and a third pixel row 154. For the first pixel row 150, the first pixel L, the second pixel R, and the normal pixel N are included in the same row. The first pixel L and the second pixel R are alternately arranged in the row direction, with a plurality of normal pixels N (two normal pixels N in the example illustrated in FIG. 5) interposed therebetween, such that the first pixel L and the second pixel R are allocated to the G filters. The second pixel row 152 is different from the first pixel row 150 in that the first pixel L and the second pixel R are reversed. The third pixel row 154 indicates a row having only the normal pixels N. The first pixel row 150 and the second pixel row 152 are alternately arranged in the column direction, with a plurality of third pixel rows 154 (for example, the number of third pixel rows 154 is changed in a predetermined cycle in the column direction in the first embodiment) interposed therebetween.

As such, since the first pixel row 150, the second pixel row 152, and the third pixel row 154 are arranged according to a predetermined rule, the first pixels L and the second pixels R are alternately arranged in the row direction and the column direction in the imaging element 20. In the first embodiment, the first pixels L are arranged in the row direction and alternate every six pixels and the second pixels R are arranged in the row direction and alternate every six pixels. In addition, the first pixels L are arranged in the column direction and alternate every six pixels and the second pixels R are arranged in the column direction and alternate every six pixels.

Figure 6:
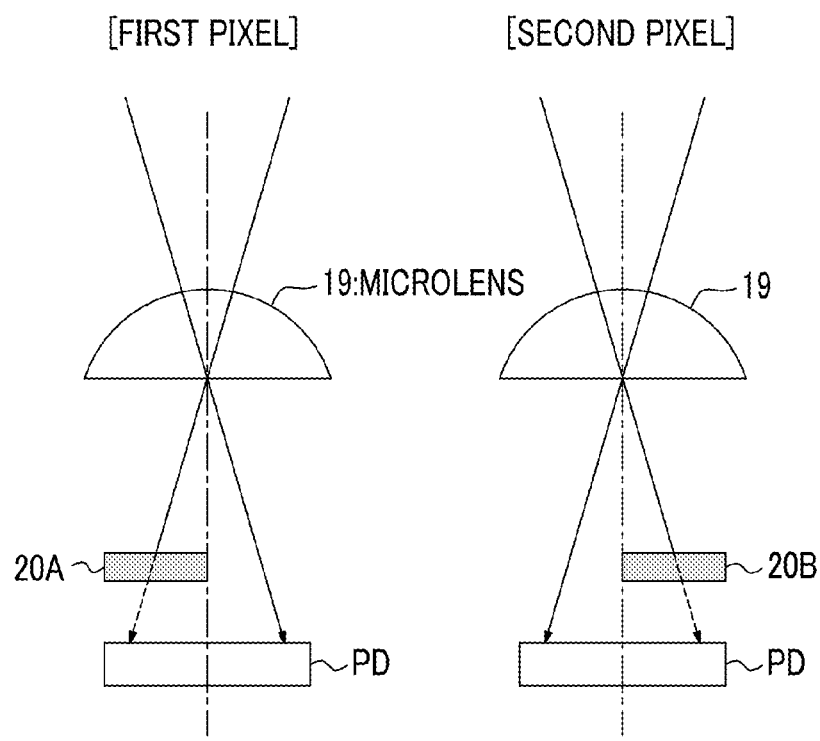
FIG. 6 is a diagram schematically illustrating an example of the structure of the first pixel and the second pixel in the imaging element of the imaging device according to the first and second embodiments.

For example, as illustrated in FIG. 6, the first pixel L is a pixel in which the left half of the light receiving surface in the row direction is shielded by a light shielding member 20A (the left side in a case in which the object is viewed from the light receiving surface (in other words, the right side in a case in which the light receiving surface is viewed from the object)). For example, as illustrated in FIG. 6, the second pixel R is a pixel in which the right half of the light receiving surface in the row direction is shielded by a light shielding member 20B (the right side in a case in which the object is viewed from the light receiving surface (in other words, the left side in a case in which the light receiving surface is viewed from the object)). In the following description, in a case in which the first pixel L and the second pixel R do not need to be distinguished from each other, they are referred to as "phase difference pixels".

A light flux which passes through the exit pupil of the imaging lens 16 is mainly divided into left region passage light and right region passage light. The left region passage light indicates the left half of the light flux which passes through the exit pupil of the imaging lens 16 and the right region passage light indicates the right half of the light flux which passes through the exit pupil of the imaging lens 16. The light flux which passes through the exit pupil of the imaging lens 16 is divided into left and right light fluxes by the microlens 19 and the light shielding members 20A and 20B serving as a pupil division portion. The first pixel L receives the left region passage light and the second pixel R receives the right region passage light. As a result, an object image corresponding to the left region passage light and an object image corresponding to the right region passage light are acquired as parallax images (a left parallax image which corresponds to an object image corresponding to the left region passage light and a right parallax image which corresponds to an object image corresponding to the right region passage light) with parallaxes. In the following description, in a case in which the light shielding members 20A and 20B do not need to be distinguished from each other, they are referred to as "light shielding members" without a reference numeral.

The imaging element 20 is divided into a first pixel group, a second pixel group, and a third pixel group. The first pixel group indicates, for example, a plurality of first pixels L which are arranged in a matrix, as illustrated in FIG. 5. The second pixel group indicates, for example, a plurality of second pixels R which are arranged in a matrix, as illustrated in FIG. 5. The third pixel group indicates, for example, a plurality of normal pixels N, as illustrated in FIG. 5. Here, the normal pixels N indicate, for example, pixels (for example, pixels without the light shielding members 20A and 20B) other than the phase difference pixels. In the following description, in a case in which the first to third pixel groups do not need to be distinguished from each other, they are referred to as "pixel groups".

Hereinafter, for convenience of explanation, a pixel signal which is output from each first pixel L in unit of pixel is referred to as a "first pixel signal". A pixel signal which is output from each second pixel R in unit of pixel is referred to as a "second pixel signal". A pixel signal which is output from each normal pixel N in unit of pixel is referred to as a "third pixel signal". In the following description, in a case in which the first to third pixel signals do not need to be distinguished from each other, they are referred to as "pixel signals".

Hereinafter, for convenience of explanation, an image signal which is output from the first pixel group in unit of pixel group (in unit of screen) and indicates the left parallax image (hereinafter, referred to as a "left eye image") is referred to as a "first image signal". An image signal which is output from the second pixel group in unit of pixel group and indicates the right parallax image (hereinafter, referred to as a "right eye image") is referred to as a "second image signal". An image signal which is output from the third pixel group and indicates a non-parallax image (an image without parallax) is referred to as a "third image signal". Hereinafter, in a case in which the first to third image signals do not need to be distinguished from each other, they are referred to as "image signals".

The first image signal, the second image signal, and the third image signal (image signals corresponding to one screen) which are acquired by the imaging element 20 at the same imaging time are acquired by the image processing unit 28 at the same time.

The image processing unit 28 performs various kinds of image processing for the acquired image signals. The image processing unit 28 is implemented by, for example, an application specific integrated circuit (ASIC) which is an integrated circuit obtained by integrating circuits with a plurality of functions related to various kinds of image processing. However, the hardware configuration of the image processing unit 28 is not limited thereto. For example, the image processing unit 28 may be a programmable logic device or may have other hardware configurations such as a computer including a CPU, a ROM, and a RAM.

The image processing unit 28 includes a normal image generation unit 28A (an example of a generation unit according to the invention), a split image generation unit 28B (an example of a generation unit according to the invention), and a control unit 28C (an example of a control unit according to the invention). The normal image generation unit 28A acquires the third image signal and generates a normal image (an example of a third image according to the invention) on the basis of the acquired third image signal. The normal image is a chromatic image and is, for example, a color image having the same color array as the array of the normal pixels N.

In the normal image, for all of the normal pixels N included in the third pixel group, the third pixel signals from the pixels of colors other than a corresponding color are interpolated with the third pixel signals from neighboring pixels. The normal image is generated on the basis of the third pixel signals from all of the R, G, and B normal pixels N. That is, a so-called YC conversion process is performed for the third pixel signals from all of the R, G, and B normal pixels N to generate a brightness signal Y and color difference signals Cr and Cb and a normal image with a size corresponding to the size of a screen is generated on the basis of the generated brightness signal Y and the color difference signals Cr and Cb.

The split image generation unit 28B acquires the first and second image signals and generates an achromatic split image (an example of an achromatic image according to the invention) as an image used to check focus, on the basis of the acquired first and second image signals. Here, for example, the split image generation unit 28B performs signal processing for the first image signal and the second image signal to generate the brightness signal Y and generates the achromatic split image on the basis of the generated brightness signal Y.

Figure 8:
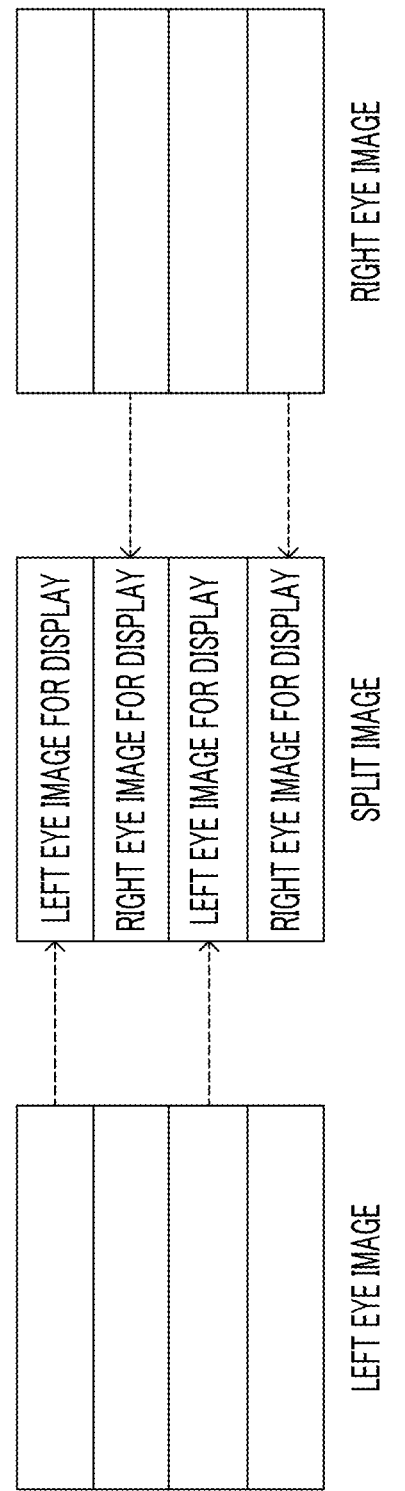
FIG. 8 is a diagram schematically illustrating a method for generating a split image which is generated by the image processing unit included in the imaging device according to the first and second embodiments.

For example, as illustrated in FIG. 8, the split image is an image in which a left eye image for display (an example of a first image according to the invention) and a right eye image for display (an example of a second image according to the invention) are arranged so as to be adjacent to each other in a predetermined direction (for example, a direction perpendicular to a direction in which parallax occurs). The left eye images for display indicate some (the first and third divided images in a front view in the example illustrated in FIG. 8) of four divided images obtained by dividing the left eye image into four images in a predetermined direction. The right eye images for display indicate divided images (the second and fourth divided images in a front view in the example illustrated in FIG. 8) which are extracted from four divided images obtained by dividing the right eye image into four images in a predetermined direction and correspond to divided regions adjacent to the divided regions corresponding to the left eye images for display.

The control unit 28C is connected to the normal image generation unit 28A and the split image generation unit 28B and acquires the normal image generated by the normal image generation unit 28A and the achromatic split image generated by the split image generation unit 28B. The control unit 28C outputs the normal image acquired from the normal image generation unit 28A to the display control unit 36 (see FIG. 3).

The control unit 28C acquires the first and second image signals used to generate the split image. Then, in a case in which the result of comparison between the output value of the acquired first image signal and the output value of the acquired second image signal is less than a threshold value, the control unit 28C generates a chromatic split image (an example of a chromatic image according to the invention) and outputs the chromatic split image to the display control unit 36 (see FIG. 3). The chromatic split image is generated by giving the chromatic color included in the normal image to the right eye image for display and the left eye image for display corresponding to the position of the normal image.

In a case in which the result of comparison between the output value of the acquired first image signal and the output value of the acquired second image signal is equal to or greater than the threshold value, the control unit 28C outputs the achromatic split image acquired from the split image generation unit 28B to the display control unit 36 (see FIG. 3). In the following description, in a case in which the achromatic split image and the chromatic split image do not need to be distinguished from each other, they are referred to as "split images".

Returning to FIG. 3, the hybrid finder 220 includes a liquid crystal display (hereinafter, referred to as a "second display") 247 which displays an electronic image.

The display control unit 36 is connected to the first display 215 and the second display 247. The display control unit 36 selectively controls the first display 215 and the second display 247 such that the first display 215 and the second display 247 (an example of a display unit according to the invention) selectively display images, in response to an instruction from the CPU 12. Hereinafter, in a case in which the first display 215 and the second display 247 do not need to be distinguished from each other, they are referred to as "display devices".

Figure 9:
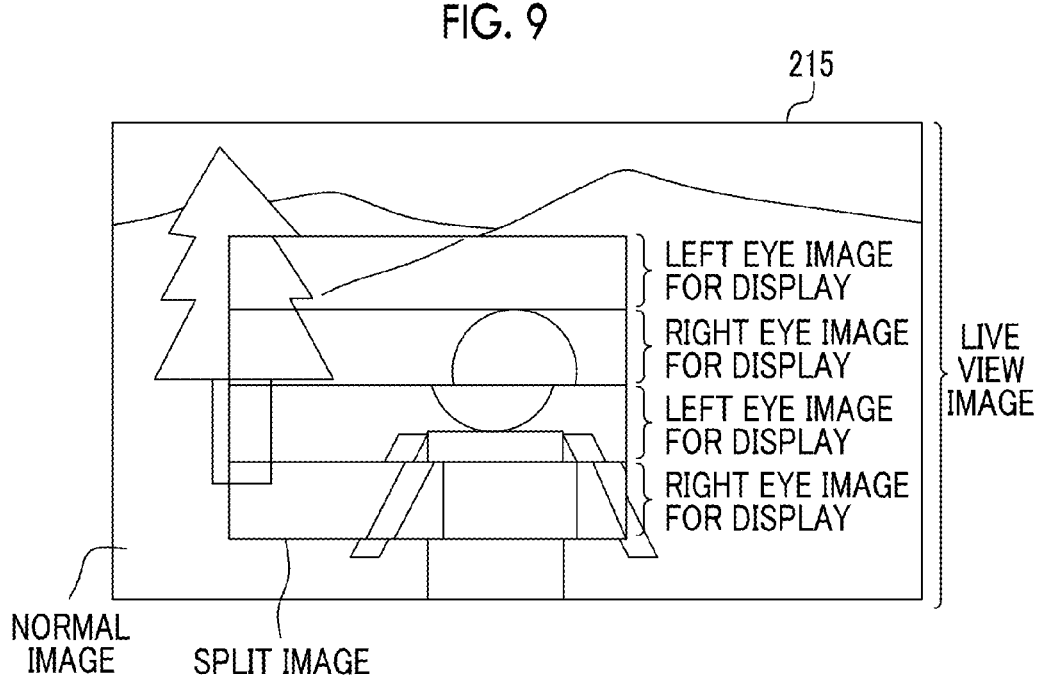
FIG. 9 is a screen view illustrating an example of a live view image including a split image and a normal image which is displayed on a first display included in the imaging device according to the first and second embodiments.

For example, as illustrated in FIG. 9, the split image is displayed in a rectangular frame which is disposed at the center of the screen of the display device and the normal image is displayed in a peripheral region of the split image. FIG. 9 illustrates an example of the split image in which two right eye images for display and two left eye images for display are alternately arranged in a predetermined direction. The left eye image for display and the right eye image for display included in the split image deviate from each other in the direction in which parallax occurs according to a focus state. In addition, FIG. 9 illustrates a state in which a peripheral region (for example, a tree) of a person is in focus and the person is out of focus.

In the first embodiment, the split image is inserted, instead of a portion of the normal image, and is combined with the normal image. However, the invention is not limited thereto. For example, a combination method which superimposes the split image on the normal image may be used. When the split image is superimposed, a combination method may be used which appropriately adjusts the transmittance of the split image and a portion of the normal image on which the split image is superimposed. In this case, a live view image indicating object images which are continuously captured is displayed on the screen of the display device. The displayed live view image is an image in which the split image is displayed in the display region of the normal image.

The imaging device 100 according to the first embodiment is configured such that the operation mode can be switched between the manual focus mode and the automatic focus mode by the dial 212 (focus mode switching unit). When any one of the focus modes is selected, the display control unit 36 directs the display device to display the live view image with which the split image is combined. In addition, when the automatic focus mode is selected by the dial 212, the CPU 12 operates as a phase difference detection unit and an automatic focus adjustment unit. The phase difference detection unit detects a phase difference between the left eye image and the right eye image. The automatic focus adjustment unit controls the motor 304 through the mounts 256 and 346 on the basis of the detected phase difference such that the focus lens 302 is moved to the in-focus position and the amount of defocus of the focus lens 302 is zero, in response to an instruction from the device control unit 22. The "amount of defocus" means, for example, the amount of phase shift between the left eye image and the right eye image.

Returning to FIG. 3, the eye approach detection unit 37 detects whether the user (for example, a photographer) looks through the finder eyepiece 242 and outputs the detection result to the CPU 12. Therefore, the CPU 12 can check whether the finder eyepiece 242 is used on the basis of the detection result of the eye approach detection unit 37.

The external I/F 39 is connected to a communication network, such as a local area network (LAN) or the Internet, and transmits and receives various kinds of information between an external apparatus (for example, a printer) and the CPU 12 through the communication network. Therefore, in a case in which a printer is connected as the external apparatus, the imaging device 100 can output the captured still image to the printer such that the still image is printed by the printer. In a case in which a display is connected as the external apparatus, the imaging device 100 can output the captured still image or live view image to the display such that the display displays the image.

Figure 10:
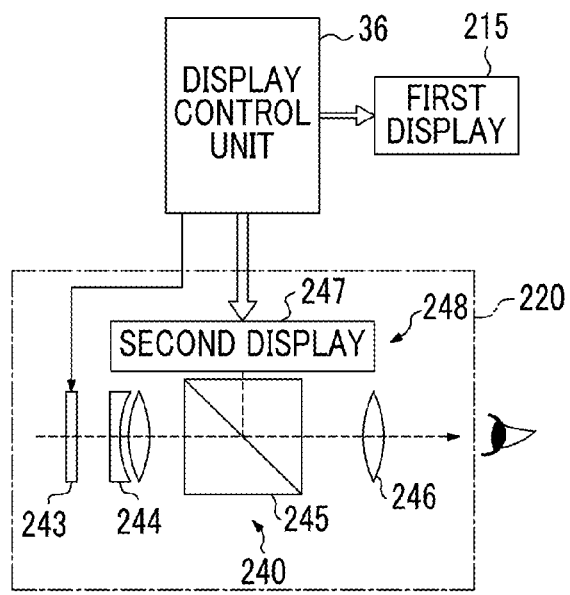
FIG. 10 is a diagram schematically illustrating an example of the structure of a hybrid finder included in the imaging device according to the first and second embodiments.

For example, as illustrated in FIG. 10, the hybrid finder 220 includes the OVF 240 and the EVF 248. The OVF 240 is an inverted Galilean finder including an objective lens 244 and an eyepiece lens 246. The EVF 248 includes the second display 247, a prism 245, and the eyepiece lens 246.

A liquid crystal shutter 243 is provided in front of the objective lens 244. The liquid crystal shutter 243 shields light such that no optical image is incident on the objective lens 244 when the EVF 248 is used.

The prism 245 reflects an electronic image or various kinds of information displayed on the second display 247 to the eyepiece lens 246 and combines the optical image and information (the electronic image or various kinds of information) displayed on the second display 247.

Whenever the finder switching lever 214 is rotated in the direction of the arrow SW illustrated in FIG. 1, the operation mode is alternately switched between an OVF mode in which an optical image can be viewed through the OVF 240 and an EVF mode in which an electronic image can be viewed through the EVF 248.

In the OVF mode, the display control unit 36 performs control such that the liquid crystal shutter 243 does not shield light and an optical image can be viewed through the finder eyepiece. In addition, the display control unit 36 directs the second display 247 to display only the split image. Therefore, it is possible to display a finder image in which the split image is superimposed on a portion of the optical image.

In contrast, in the EVF mode, the display control unit 36 performs control such that the liquid crystal shutter 243 shields light and only the electronic image displayed on the second display 247 can be viewed through the finder eyepiece. In addition, the same image data as that, with which the split image output to the first display 215 is combined, is input to the second display 247. Therefore, the second display 247 can display an electronic image in which the split image is combined with a portion of the normal image, similarly to the first display 215.

Next, as the operation of the first embodiment, an image generation process which is performed by the image processing unit 28 under the control of the CPU 12 will be described with reference to FIG. 11. The image generation process illustrated in FIG. 11 is performed by the image processing unit 28 in a case in which the first to third image signals corresponding to one screen are stored in the primary storage unit 25 after the manual focus mode is set.

Figure 11:
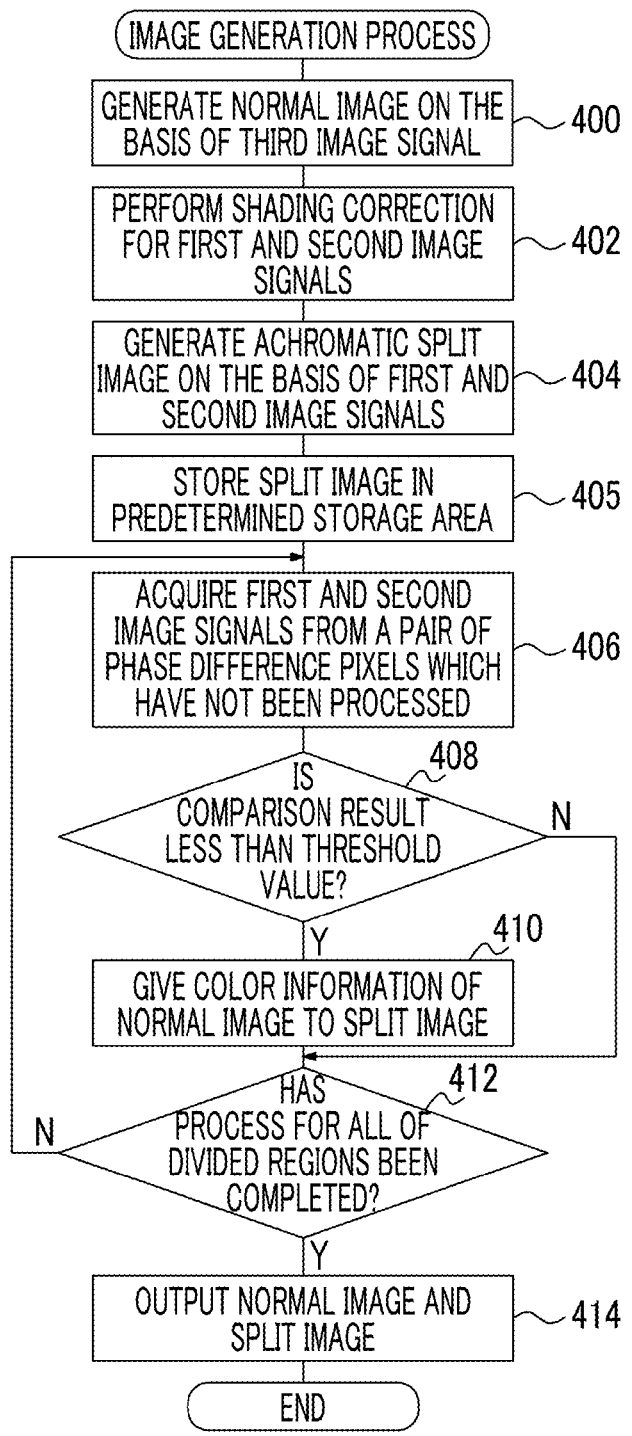
FIG. 11 is a flowchart illustrating an example of the flow of an image generation process according to the first embodiment.

In the image generation process illustrated in FIG. 11, first, in Step 400, the normal image generation unit 28A acquires the third image signal from the primary storage unit 25 and generates a normal image on the basis of the acquired third image signal.

Figure 12:
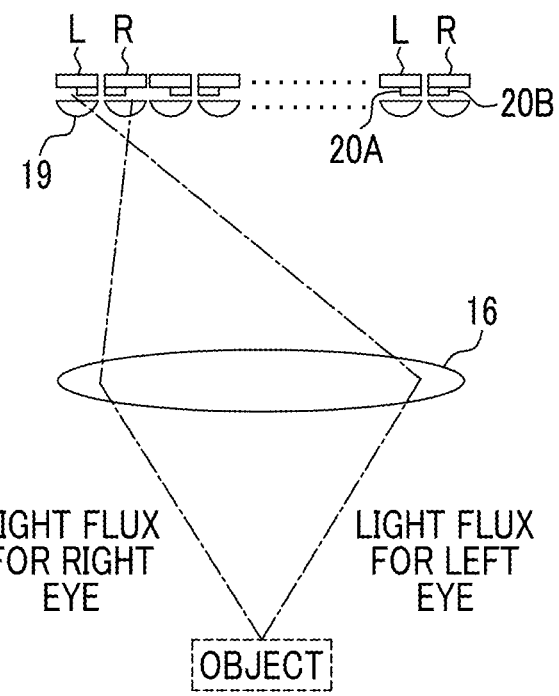
FIG. 12 is a diagram illustrating the principle of shading characteristics by left region passage light and right region passage light (an example of the path of a light flux incident on each of the first and second pixels).
Figure 13:
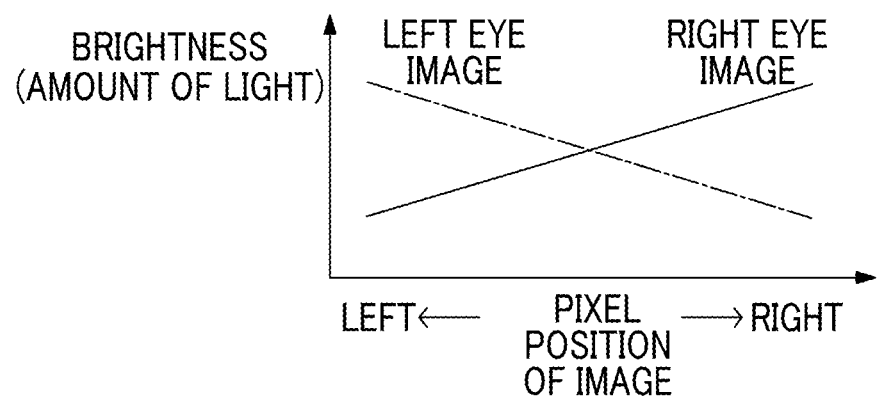
FIG. 13 is a graph illustrating an example of the influence of linear shading characteristics in a pupil division direction on the output of each pixel in a direction corresponding to the pupil division direction in each of a left eye image and a right eye image.

For example, as illustrated in FIG. 12, in the imaging device 100, in a case in which an image of the object is captured, left region passage light which has passed through the imaging lens 16 is incident on the first pixel L through the microlens 19 corresponding to the first pixel L. However, when the left region passage light passes through the microlens 19 corresponding to the second pixel R, it is blocked by the light shielding member 20B and is not incident on the second pixel R. In contrast, right region passage light which has passed through the imaging lens 16 is incident on the second pixel R through the microlens 19 corresponding to the second pixel R. However, in a case in which the right region passage light passes through the microlens 19 corresponding to the first pixel L, it is blocked by the light shielding member 20A and is not incident on the first pixel L. As such, the light shielding member is provided in the half of the pixel and the center of each of the left region passage light and the right region passage light deviates from the optical axis of the imaging lens 16. Therefore, in each of the first pixel group and the second pixel group, the shading characteristics vary linearly depending on the position of the pixel in the pupil division direction. A change in the shading characteristics appears as a change in the output of the left eye image and the right eye image. That is, the output of the left eye image and the right eye image which are obtained in a case in which a uniform amount of light is incident on the imaging lens 16 from the front side, in the left-right direction (a direction corresponding to the pupil division direction) varies linearly depending on the position of the pixel. For example, as illustrated in FIG. 13, the output of the left eye image is reduced as the position of the pixel becomes closer to the right side and the output of the right eye image is reduced as the position of the pixel becomes closer to the left side. The linear changes in the outputs of the left eye image and the right eye image, which are opposite to each other in the left-right direction, have an effect on the quality of the split image.

In the image generation process illustrated in FIG. 11, in Step 402, the split image generation unit 28B acquires the first image signal and the second image signal from the primary storage unit 25 and performs shading correction for the acquired first and second image signals. Here, the shading correction means a process of correcting the shading characteristics of the first image signal and the second image signal on the basis of a correction coefficient which is determined according to the shading characteristics. The correction coefficient is calculated on the basis of, for example, a straight line for correction. The straight line for correction is, for example, a primary function in which the sum of the squires of the distance between a regression line for outputs from a plurality of pixels included in a specific rows and a target sensitivity ratio (for example, 1.0) is the minimum and a dependent variable of the straight line for correction is used as the correction coefficient. The correction coefficient is not limited thereto and may be a default value which is obtained in advance by, for example, an experiment or a simulation using an actual machine (a correction coefficient that cancels the expected shading characteristics). In this embodiment, the output value of the first image signal and the output value of the second image signal are corrected. However, the invention is not limited thereto. For example, the sensitivity of the first pixel L and the second pixel R may be corrected.

Figure 14:
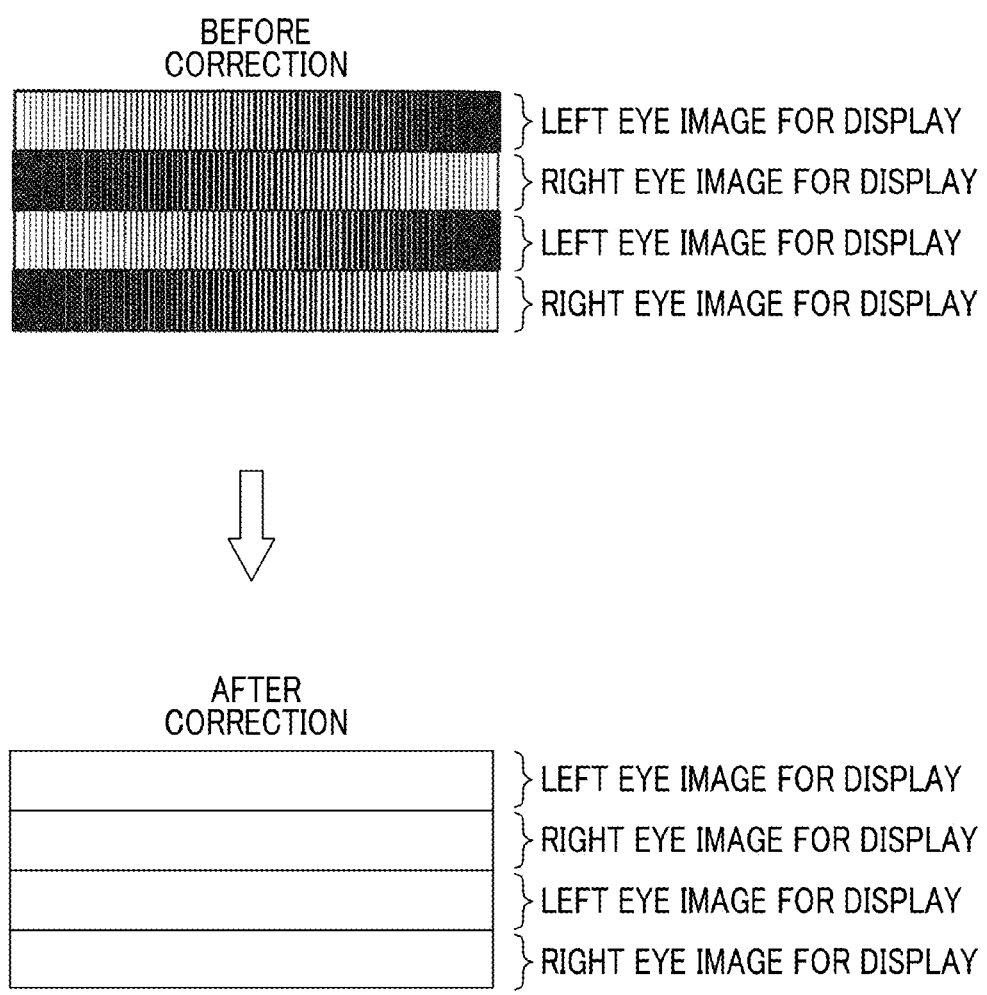
FIG. 14 is a conceptual diagram illustrating an example of the influence of the shading characteristics on a left eye image for display and a right eye image for display before and after correction.

As such, when the process in Step 402 is performed, it is possible to reduce the influence of the shading characteristics on a split image to be generated in Step 404 which will be described below. That is, for example, as illustrated in FIG. 14, a linear change in the output of the left eye image for display and the right eye image for display due to a linear change in the sensitivity of the pixels in the pupil division direction is reduced, as compared to a case in which correction is not performed on the basis of the correction coefficient.

Then, in Step 404, the split image generation unit 28B generates an achromatic split image on the basis of the first and second image signals subjected to shading correction in Step 402. Then, the process proceeds to Step 405.

In Step 405, the split image generation unit 28B stores the split image generated in Step 404 in a storage area that is predetermined (hereinafter, referred to as a "predetermined storage area" for convenience of explanation) in the primary storage unit 25. Then, the process proceeds to Step 406.

In Step 406, the control unit 28C acquires the first and second pixel signals of a pair of phase difference pixels which have not been processed among the first and second image signals subjected to shading correction in Step 402. Then, the process proceeds to Step 408. Here, the first and second pixel signals which "have not been processed" mean the first and second pixel signals which have not been acquired in Step 406. In addition, here, the "pair of phase difference pixels" indicate, for example, a pair of phase difference pixels (the first pixel L and the second pixel R) which are adjacent to each other in a direction (for example, a direction perpendicular to) intersecting the pupil division direction. In the example illustrated in FIG. 5, the pair of phase difference pixels indicate a pair of the first pixel L and the second pixel R (the first pixel L and the second pixel R which are adjacent to each other in the column direction) which are aligned with each other in the row direction in the first pixel row 150 and the second pixel row 152.

In Step 408, the control unit 28C determines whether the result of comparison between the output value of the first pixel signal acquired in Step 406 and the output value of the second pixel signal acquired in Step 406 is less than a threshold value. Here, an example of the comparison result is the absolute value (hereinafter, referred to as a "difference absolute value") of the difference between the output value of the first pixel signal acquired in Step 406 and the output value of the second pixel signal acquired in Step 406.

In a case in which it is determined in Step 408 that the result of comparison between the output value of the first pixel signal acquired in Step 406 and the output value of the second pixel signal acquired in Step 406 is less than the threshold value, that is, the determination result is "Yes", the process proceeds to Step 410. In a case in which it is determined in Step 408 that the result of comparison between the output value of the first pixel signal acquired in Step 406 and the output value of the second pixel signal acquired in Step 406 is equal to or greater than the threshold value, that is, the determination result is "No", the process proceeds to Step 412.

For convenience of explanation, in the first embodiment, the "in-focus state" is not limited to the case in which the amount of defocus is zero and means a case in which the comparison result is less than the threshold value. For convenience of explanation, in the first embodiment, the "out-of-focus state" means a case in which the comparison result is equal to or greater than the threshold value.

In Step 410, the control unit 28C gives the color information of the normal image at a position corresponding to the position of each phase difference pixel in the first and second pixel signals acquired in Step 406 to a predetermined position of the split image stored in the predetermined storage area. Here, the "predetermined position" indicates, for example, a position corresponding to the position of each phase difference pixel in the first and second pixel signals acquired in Step 406.

The color information is given to the split image, using, for example, the color difference signals Cr and Cb of the normal image generated in Step 400. Here, the brightness signal Y and the color difference signals Cr and Cb of the normal image and the split image are treated as image data with a so-called YC422 format in the memory (for example, primary storage unit 25). For example, as illustrated in FIG. 15, the normal image generated in Step 400 is decomposed into a brightness signal $Y_0$ and color difference signals $Cr_0$ and $Cb_0$. In contrast, the achromatic split image (the split image before color information is given) generated in Step 404 is decomposed into a brightness signal $Y_1$ for each pixel position corresponding to a pixel position in the normal image.

In Step 410, for example, as illustrated in FIG. 16, values obtained by multiplying the color difference signals $Cr_0$ and $Cb_0$ by the gain are applied as the color difference signals $Cr_1$ and $Cb_1$ of the split image to give color information to the achromatic split image.

Figure 17:
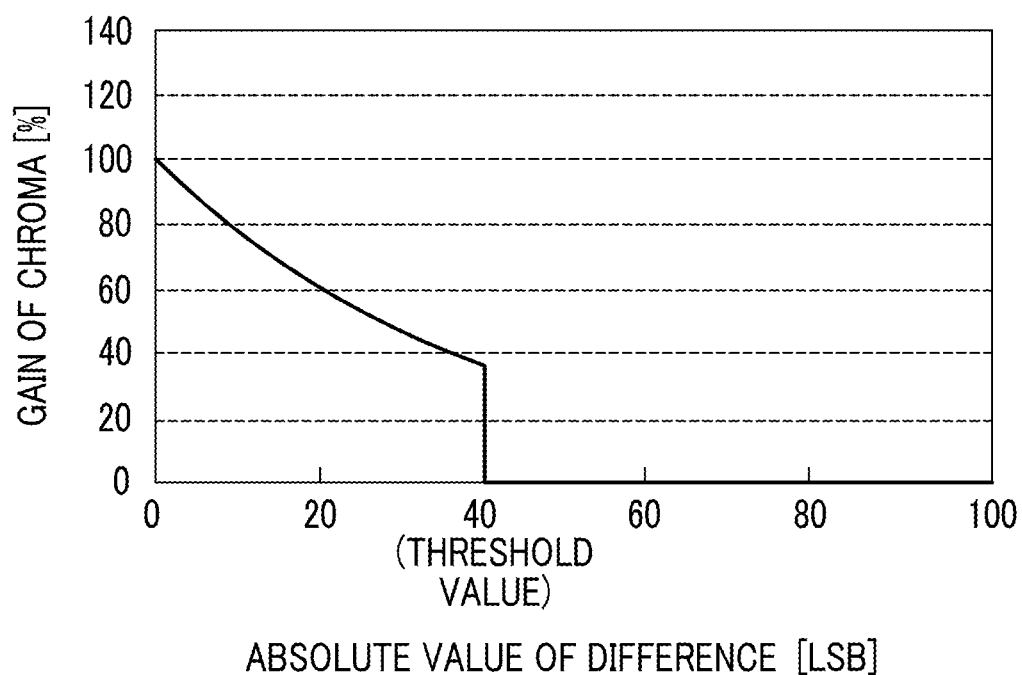
FIG. 17 is a graph illustrating an example of a correspondence relationship between a difference absolute value and a gain multiplied by the chroma of a normal image.

Here, for example, as illustrated in FIG. 17, the gain multiplied by the color difference signals $Cr_0$ and $Cb_0$ is predetermined as a value that varies depending on the difference absolute value. In the example illustrated in FIG. 17, the threshold value is set to "40". Therefore, in a case in which the difference absolute value is equal to or greater than "40", the color difference signals $Cr_0$ and $Cb_0$ are multiplied by "0". In this case, no color information is given to the achromatic split image (Step 408: N). In contrast, in a case in which the difference absolute value is less than "40", the color difference signals $Cr_0$ and $Cb_0$ are multiplied by a larger gain as the difference absolute value become smaller (Step 410). As a result, a chromatic color which is given to the achromatic split image is more vividly represented as the difference absolute value becomes smaller. The correspondence relationship between the gain and the difference absolute value illustrated in FIG. 17 is stored as a table or an arithmetic expression in the secondary storage unit 26 in advance. The control unit 28C reads the table or the arithmetic expression from the secondary storage unit 26 and uses the read table or arithmetic expression.

Then, in Step 412, the control unit 28C determines whether all of the pairs of phase difference pixels have been processed (whether the process in Step 406 has been performed for all of the pairs of phase difference pixels). In a case in which it is determined in Step 412 that all of the pairs of phase difference pixels have been processed, that is, the determination result is "Yes", the process proceeds to Step 414. In a case in which it is determined in Step 412 that all of the pairs of phase difference pixels have not been processed, that is, the determination result is "No", the process proceeds to Step 406.

In Step 414, the control unit 28C outputs the normal image generated in Step 400 to the display control unit 36 and outputs the split image stored in the predetermined storage area to the display control unit 36. Then, the control unit 28C ends the image generation process. When receiving the normal image and the split image, the display control unit 36 performs control such that the display device continuously displays the normal image as a moving image and continuously displays the split image as a moving image in the display region of the normal image. Then, for example, as illustrated in FIG. 9, the display device displays a live view image. Therefore, the photographer can check the in-focus state, using the split image displayed on the display device. In addition, the image generation process illustrated in FIG. 11 is performed in the manual focus mode. Therefore, the photographer can operate the focus ring 301 to adjust the amount of defocus to zero while viewing the split image.

As described above, the imaging device 100 compares the output value of the first image signal with the output value of the second image signal. In a case in which the comparison result is less than a threshold value, the chromatic color included in the normal image is given to the achromatic split image at a position corresponding to the position of the normal image. Then, the chromatic split image is displayed. In a case in which the comparison result is equal to or greater than the threshold value, the achromatic split image is displayed. Therefore, the imaging device 100 can instantly switch the split image between the chromatic split image and the achromatic split image, as compared to a case in which a phase difference is calculated.

In the imaging device 100, the achromatic split image and the chromatic split image are selectively displayed in the display region of the normal image. Therefore, the imaging device 100 enables the user to visibly recognize whether an image is in focus with ease, as compared to a case in which the achromatic split image and the chromatic split image are not selectively displayed in the display region of the normal image.

In the imaging device 100, it is determined whether the difference absolute value is less than the threshold value. Therefore, the imaging device 100 can determine whether an image is in focus with high accuracy, as compared to a case in which the difference absolute value is not used.

In the imaging device 100, it is determined whether the result of comparison between the output value of the first image signal subjected to shading correction and the output value of the second image signal subjected to shading correction is less than the threshold value. Therefore, the imaging device 100 can accurately determine whether an image is in focus, as compared to a case in which the output values of the first and second image signals subjected to shading correction are not used.

In the imaging device 100, it is determined whether the result of comparison between the output value of the first image signal and the output value of the second image signal from a pair of phase difference pixels which are arranged in a direction intersecting the pupil division direction is less than the threshold value. Therefore, the imaging device 100 can determine whether an image is in focus with high accuracy, as compared to a case in which the output values of the first and second pixel signals from a pair of phase difference pixels that are arranged in a direction intersecting the pupil division direction are not used.

In the imaging device 100, chroma is given from the normal image to the achromatic split image by the color difference signals Cr and Cb and a chromatic color is given to the achromatic split image. Therefore, the imaging device 100 can give a chromatic color to the achromatic split image with a simple structure, as compared to a case in which chroma is not given from the normal image to the achromatic split image by the color difference signals Cr and Cb.

In the imaging device 100, in a case in which the comparison result is less than the threshold value, as the difference between the comparison result and the threshold value increases, the intensity of the chromatic color given to the achromatic split image increases. Therefore, the imaging device 100 can achieve a slow change in color in a region between a chromatic color region and an achromatic color region, as compared to a case in which the intensity of the chromatic color does not increase as the difference between the comparison result and the threshold value increases.

In the first embodiment, it is determined whether color information needs to be given to the split image on the basis of whether the difference absolute value is less than the threshold value. However, the invention is not limited thereto. For example, the determination may be performed on the basis of the degree of deviation of the ratio of the output value of the pixel signal from one of a pair of phase difference pixels to the output value of the pixel signal from the other phase difference pixel from a reference value. Here, the ratio of the output value of the pixel signal from one of the pair of phase difference pixels to the output value of the pixel signal from the other phase difference pixel indicates, for example, the ratio of the output value of the second pixel signal to the output value of the first pixel signal acquired in Step 406. The reference value is, for example, "1". In this case, for example, when the ratio of the output values of the pixel signals from the pair of phase difference pixels is in a predetermined range (for example, a range that is equal to or greater than 0.8 and equal to or less than 1.2), color information is given to the split image. When the ratio is out of the predetermined range, no color information is given to the split image.

In the first embodiment, in order to adjust the intensity of the chromatic color given to the split image, chroma given to the split image is adjusted by the gain (see FIG. 17) that is determined according to the difference absolute value. However, the invention is not limited thereto. For example, chroma given to the split image may be adjusted by the gain that is determined according to a normalized value of the difference absolute value. In this case, for example, the chroma $C_0$ of the normal image is converted into chroma $C_1$ using the following Expression (1) and the converted chroma $C_1$ is applied as the chroma of the split image (the chroma $C_1$ is given to the split image). In Expression (1), "ΔS" indicates the difference absolute value, "Avg" indicates a phase difference pixel average value (for example, the average value of the output value of the first pixel signal acquired in Step 406 and the output value of the second pixel signal acquired in Step 406). In addition, "a" and "b" are coefficients for fine adjustment and may be fixed values or variables (for example, values which are customized according to an instruction received by the touch panel 216.

$$C_1 = C_0 \times (a\hat{}(\Delta S/\text{Avg}) \times b) \tag{1}$$

Figure 18:
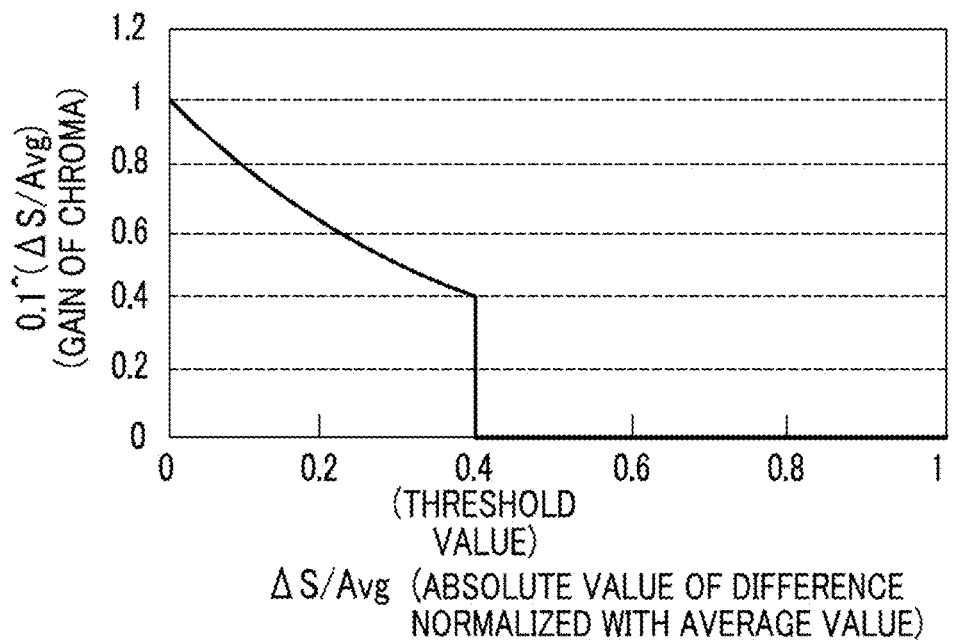
FIG. 18 is a graph illustrating an example of a correspondence relationship between a normalized difference absolute value and a gain multiplied by the chroma of a normal image.

Here, in a case in which "a" is 0.1, "b" is 1, and the threshold value is 0.4, for example, the gain (=a^(ΔS/Avg)× b) multiplied by the chroma $C_0$ is predetermined as a value that is predetermined according to "ΔS/Avg", as illustrated in FIG. 18. In the example illustrated in FIG. 18, the threshold value is set to "0.4. Therefore, in a case in which "ΔS/Avg" is equal to or greater than "0.4", the chroma $C_0$ is multiplied by "0". In this case, no color information is given to the achromatic split image. In contrast, in a case in which "ΔS/Avg" is less than "0.4", the chroma $C_0$ is multiplied by a larger value as "ΔS/Avg" becomes smaller. As a result, the chromatic color given to the achromatic split image is more vividly represented as "ΔS/Avg" becomes smaller. The correspondence relationship between the gain and "ΔS/Avg" illustrated in FIG. 18 is stored as a table or an arithmetic expression in the secondary storage unit 26 in advance. The table or the arithmetic expression is read and used by the control unit 28C when color information is given to the split image.

In the example illustrated in FIG. 18, the threshold value is fixed. However, the invention is not limited thereto. For example, the threshold value may be variable. In this case, the threshold value may be determined according to imaging conditions. For example, since the depth of field varies depending on a diaphragm value, the threshold value may decrease as the diaphragm value decreases. In the examples illustrated in FIGS. 19 and 20, in a case in which the F number is less than 3.5, the threshold value is 0.4. In a case in which the F number is equal to or greater than 3.5, the threshold value is 0.6. Therefore, in a case in which the F number is less than 3.5 (in a case of which the depth of field is small), it is more difficult to give a chromatic color to the split image than in a case in which the F number is equal to or greater than 3.5 (in a case in which the depth of field is large). As a result, even in a case in which the F number is changed, it is possible to achieve the balance between the frequency of giving a chromatic color to the split image and the frequency of not giving a chromatic color to the split image.

Figure 19:
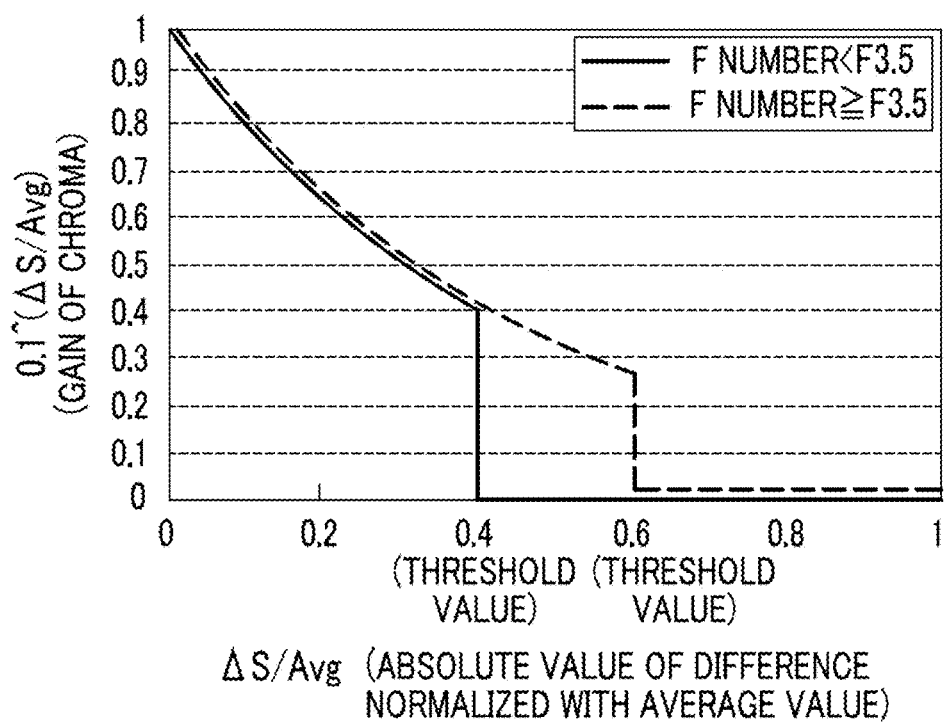
FIG. 19 is a graph illustrating an example of a correspondence relationship between a normalized difference absolute value and a gain multiplied by the chroma of a normal image in a case in which the F number is less than 3.5 and a case in which the F number is equal to or greater than 3.5.

In the example illustrated in FIG. 19, the value of the gain in a case in which ΔS/Avg is less than the threshold value and the F number is less than 3.5 is the same as that in a case in which ΔS/Avg is less than the threshold value and the F number is equal to or greater than 3.5. However, the invention is not limited thereto. That is, the value of the gain in a case in which ΔS/Avg is less than the threshold value and the F number is less than 3.5 may be different from that in a case in which ΔS/Avg is less than the threshold value and the F number is equal to or greater than 3.5. For example, in the example illustrated in FIG. 20, the value of the gain in a case in which ΔS/Avg is less than the threshold value and the F number is equal to or greater than 3.5 is greater than that in a case in which ΔS/Avg is less than the threshold value and the F number is less than 3.5. Therefore, in a case in the F number is equal to or greater than 3.5 (in a case in which the depth of field is large), the chromatic color given to the split image can be more vividly represented than that in a case in which the F number is less than 3.5 (in a case in which the depth of field is small).

Figure 22:
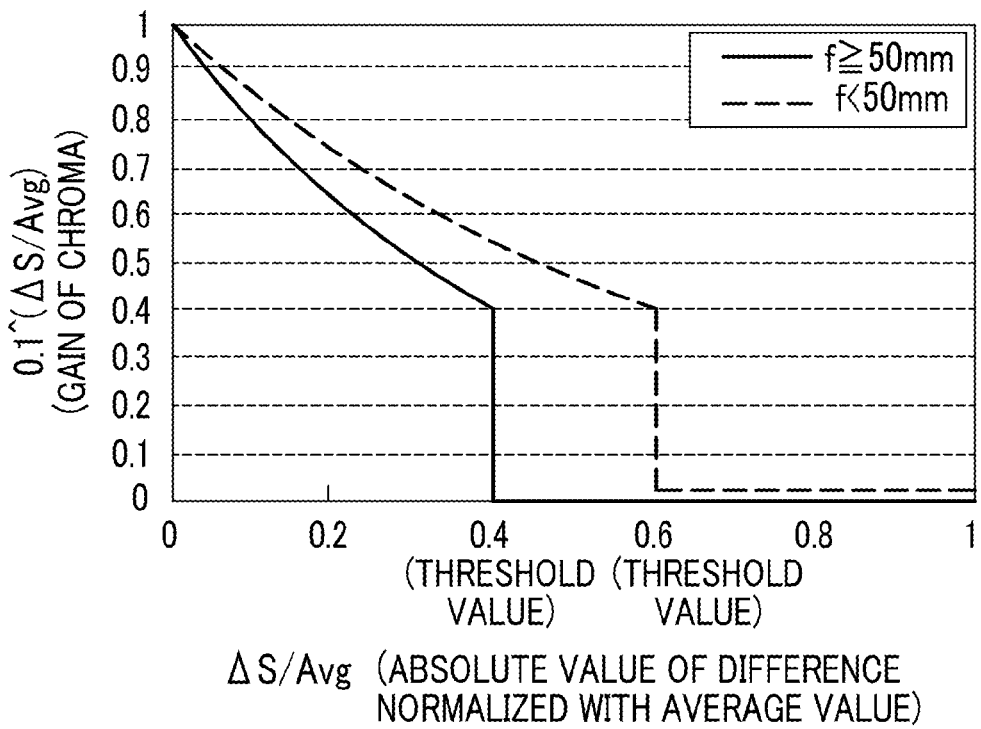
FIG. 22 is a graph illustrating another example of the correspondence relationship between the normalized difference absolute value and the gain multiplied by the chroma of the normal image in a case in which the focal length is less than 50 millimeters and a case in which the focal length is equal to or greater than 50 millimeters.

The threshold value may be determined according to the focal length. In this case, for example, since the depth of field varies depending on the focal length, the threshold value may decrease as the focal length increases. In the examples illustrated in FIGS. 21 and 22, the threshold value is 0.4 in a case in which a focal length f is equal to or greater than 50 millimeters and is 0.6 in a case in which the focal length f is less than 50 millimeters. Therefore, in a case in which the focal length f is equal to or greater than 50 millimeters (in a case in which the depth of field is small), it is more difficult to give a chromatic color to the split image than in a case in which the focal length f is less than 50 millimeters (in a case in which the depth of field is large). As a result, even in a case in which the focal length f is changed, it is possible to achieve the balance between the frequency of giving a chromatic color to the split image and the frequency of not giving a chromatic color to the split image.

In the example illustrated in FIG. 21, the value of the gain in a case in which ΔS/Avg is less than the threshold value and the focal length f is equal to or greater than 50 millimeters is the same as that in a case in which ΔS/Avg is less than the threshold value and the focal length f is less than 50 millimeters. However, the invention is not limited thereto. That is, the value of the gain in a case in which ΔS/Avg is less than the threshold value and the focal length f is equal to or greater than 50 millimeters may be different from that in a case in which ΔS/Avg is less than the threshold value and the focal length f is less than 50 millimeters. For example, in the example illustrated in FIG. 22, the value of the gain in a case in which ΔS/Avg is less than the threshold value and the focal length f is less than 50 millimeters is greater than that in a case in which ΔS/Avg is less than the threshold value and the focal length f is equal to or greater than 50 millimeters. Therefore, in a case in which the focal length f is less than 50 millimeters (in a case in which the depth of field is large), the chromatic color given to the split image can be more vividly represented than that in a case in which the focal length f is equal to or greater than 50 millimeters (in a case in which the depth of field is small).

The threshold value may be determined according to an exposure time (time value (Tv)). In this case, for example, since noise varies depending on the exposure time, the threshold value may decrease as the exposure time increases. In the examples illustrated in FIGS. 23 and 24, the threshold value is 0.4 in a case in which the Tv value is equal to or greater than 6.0 and is 0.6 in a case in which the Tv value is less than 6.0. Therefore, in a case in which the Tv value is equal to or greater than 6.0 (in a case in which the amount of noise is large), it is more difficult to give a chromatic color to the split image than in a case in which the Tv value is less than 6.0 (in a case in which the amount of noise is small). Therefore, even in a case in which the Tv value is changed, it is possible to achieve the balance between the frequency of giving a chromatic color to the split image and the frequency of not giving a chromatic color to the split image.

Figure 23:
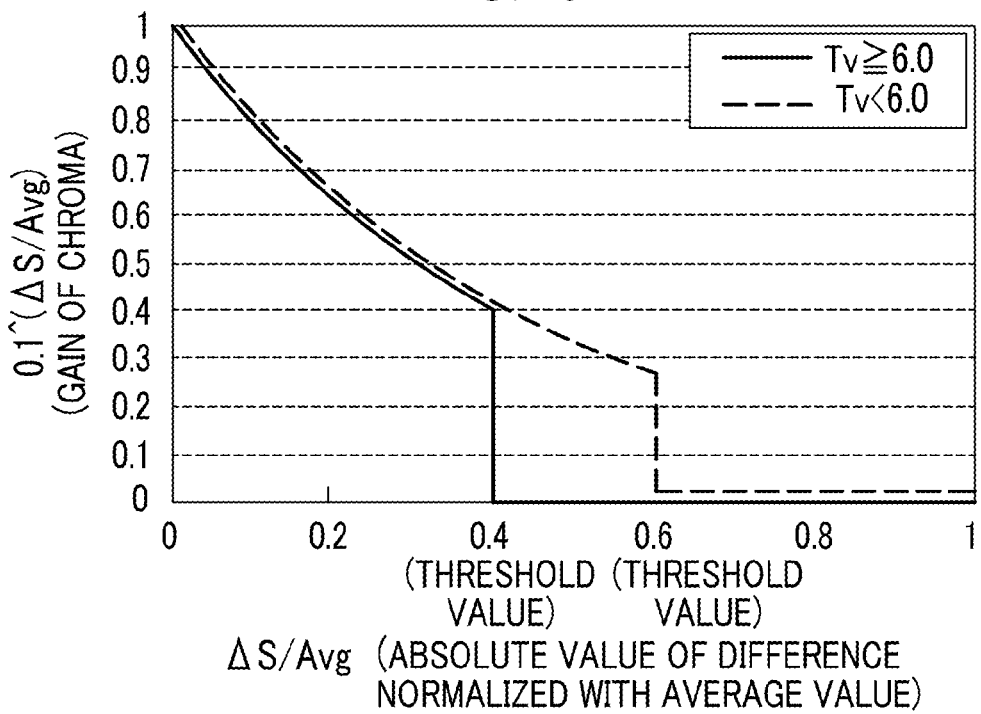
FIG. 23 is a graph illustrating an example of a correspondence relationship between a normalized difference absolute value and a gain multiplied by the chroma of a normal image in a case in which a Tv value is less than 6.0 and a case in which the Tv value is equal to or greater than 6.0.
Figure 24:
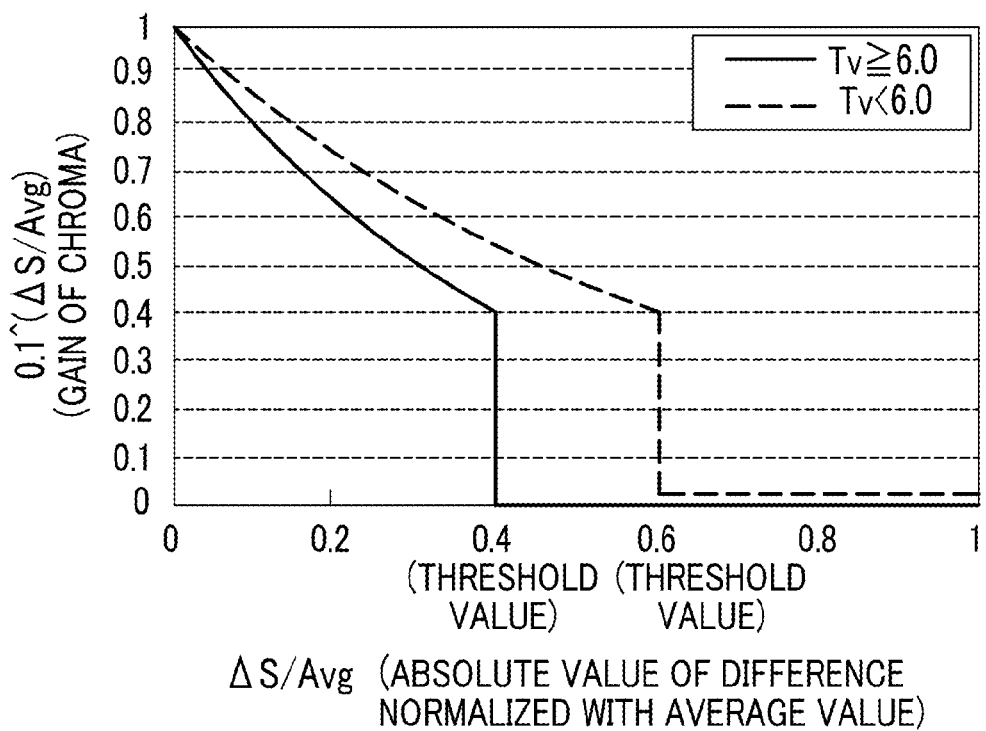
FIG. 24 is a graph illustrating another example of the correspondence relationship between the normalized difference absolute value and the gain multiplied by the chroma of the normal image in a case in which the Tv value is less than 6.0 and a case in which the Tv value is equal to or greater than 6.0.

In the example illustrated in FIG. 23, the value of the gain in a case in which ΔS/Avg is less than the threshold value and the Tv value is equal to or greater than 6.0 is the same as that in a case in which ΔS/Avg is less than the threshold value and the Tv value is less than 6.0. However, the invention is not limited thereto. That is, the value of the gain in a case in which ΔS/Avg is less than the threshold value and the Tv value is equal to or greater than 6.0 may be different from that in a case in which ΔS/Avg is less than the threshold value and the Tv value is less than 6.0. For example, in the example illustrated in FIG. 24, the value of the gain in a case in which ΔS/Avg is less than the threshold value and the Tv value is less than 6.0 is greater than that in a case in which ΔS/Avg is less than the threshold value and the Tv value is equal to or greater than 6.0. Therefore, in a case in which the Tv value is less than 6.0 (in a case in which the amount of noise is small), the chromatic color given to the split image can be more vividly represented than that in a case in which the Tv value is equal to or greater than 6.0 (in a case in which the amount of noise is large).

In addition, noise varies depending on the gain of the imaging element 20. Therefore, the threshold value may decrease as the gain of the imaging element 20 increases. In this case, even in a case in which the gain of the imaging element 20 is changed, it is possible to achieve the balance between the frequency of giving a chromatic color to the split image and the frequency of not giving a chromatic color to the split image.

Figure 25:
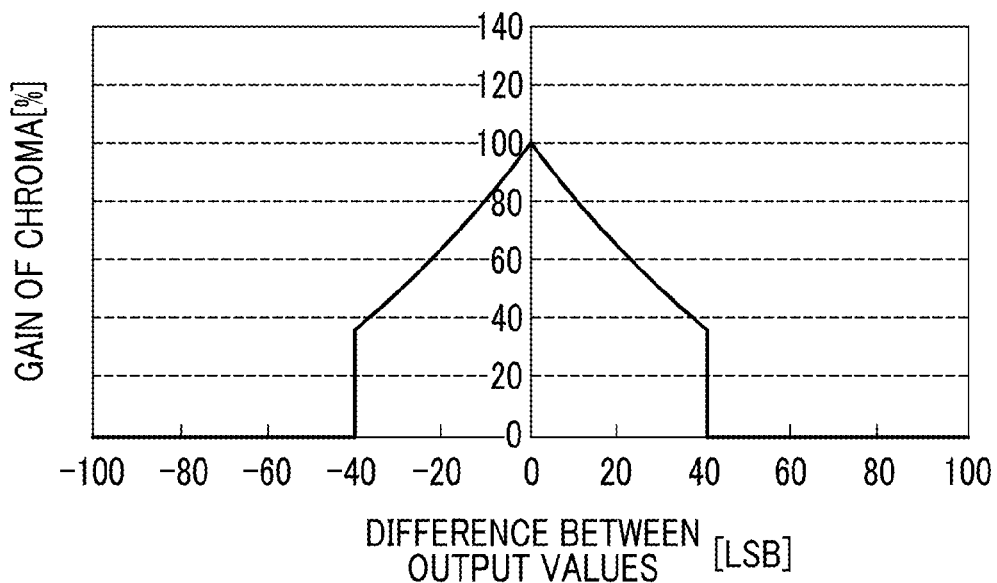
FIG. 25 is a graph illustrating an example of a correspondence relationship between an output value difference and a gain multiplied by the chroma of a normal image.

In the first embodiment, the gain is derived from the difference absolute value. However, the gain may be derived from the difference (output value difference) between the output value of the first pixel signal and the output value of the second pixel signal. In this case, for example, as illustrated in FIG. 25, the correspondence relationship between the output value difference and the gain may be determined in advance and the gain may be derived from the output value difference, using a table or an arithmetic expression indicating the correspondence relationship between the output value difference and the gain.

In the first embodiment, in a case in which the comparison result is less than the threshold value, the gain is adjusted according to the difference absolute value to adjust the intensity of the chromatic color given to the split image. However, the invention is not limited thereto. For example, in a case in which the comparison result is less than the threshold value, the chroma of the normal image may be given to the split image, without any change, regardless of the difference absolute value. In this case, it is not necessary to calculate the gain corresponding to the difference absolute value using the table or the arithmetic expression. Therefore, it is possible to further improve a switching speed between a chromatic split image and an achromatic split image.

In the first embodiment, the output value of the first pixel signal and the output value of the second pixel signal from each pair of phase difference pixels are compared with each other. However, the invention is not limited thereto. For example, the average output value of the first pixel signals output from all of the first pixels L included in the first pixel group may be compared with the average output value of the second pixel signals output from all of the second pixels R included in the second pixel group. In addition, the output values from all of the phase difference pixels may not be compared with each other, but the output values from some of the phase difference pixels may be compared with each other. In this case, for example, the average output value of the pixel signals of the first pixels L output from a first region, which is a portion of the first pixel group, may be compared with the average output value of the pixel signals of the second pixels R output from a second region (a region at a position corresponding to the position of the first region) of the second pixel group. In addition, for example, the output value of the first pixel signal which is output from the first pixel L at the center of the first pixel group may be compared with the output value of the second pixel signal which is output from the second pixel R at the center of the second pixel group.

In the first embodiment, color information is given to the split image. However, the invention is not limited thereto. For example, color information may be given to the left eye image and the right eye image before the split image is generated. In this case, it is preferable that color information is given to the left eye image which is indicated by the first image signal subjected to shading correction and the right eye image which is indicated by the second image signal subjected to shading correction.

The flow of the image generation process (see FIG. 11) described in the first embodiment is illustrative. Therefore, unnecessary steps may be removed, new steps may be added, or the order of the steps in the process may be changed, without departing from the scope and spirit of the invention. In addition, each step in the image generation process described in the first embodiment may be implemented by software configuration, that is, the execution of a program by a computer. Furthermore, each step in the image generation process described in the first embodiment may be implemented by hardware configuration, such as an ASIC or a programmable logic device, or a combination of hardware configuration and software configuration.

In a case in which the computer executes the program to implement the image generation process described in the first embodiment, the program may be stored in a predetermined storage area (for example, the secondary storage unit 26) in advance. However, the program is not necessarily stored in the secondary storage unit 26 at the beginning. For example, the program may be stored in an arbitrary portable storage medium, such as a solid state drive (SSD), a CD-ROM, a DVD disk, a magneto-optical disk, or an IC card which is connected to the computer and is then used, in advance. Then, the computer may acquire the program from the portable storage medium and execute the program. In addition, each program may be stored in another computer or a server apparatus connected to the computer through, for example, the Internet or a local area network (LAN) and the computer may acquire the program from another computer or the server apparatus and execute the program.

Figure 7:
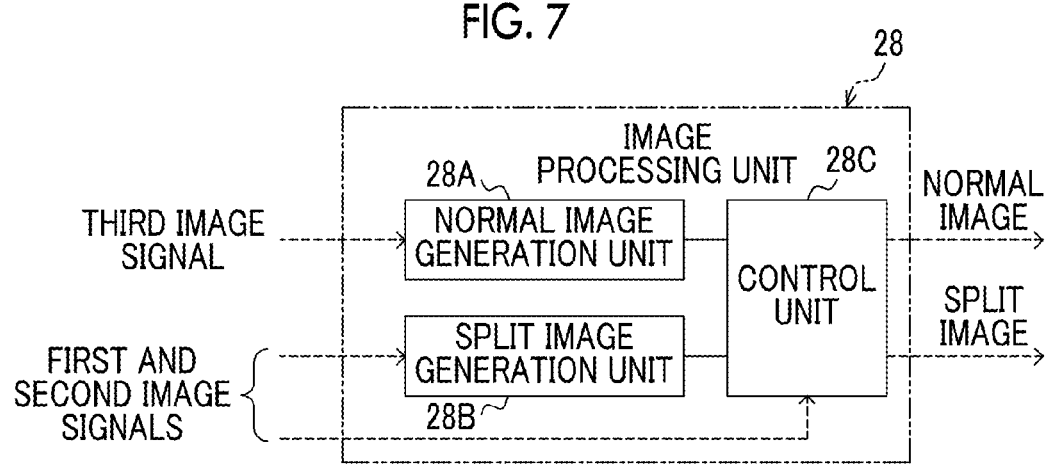
FIG. 7 is a block diagram illustrating an example of the functions of a main portion of an image processing unit included in the imaging device according to the first and second embodiments.

When each step in the image generation process described in the first embodiment is implemented by software configuration, for example, the CPU 12 may execute an image generation processing program such that the image generation process is performed in the imaging device 100. Here, the image generation processing program may be stored in the secondary storage unit 26. The CPU 12 may read the image generation processing program from the secondary storage unit 26, develop the image generation processing program in the primary storage unit 25, and execute the image generation processing program. In this case, the CPU 12 executes the image generation processing program to operate as the normal image generation unit 28A, the split image generation unit 28B, and the control unit 28C illustrated in FIG. 7.

In the first embodiment, the imaging element 20 includes the first to third pixel groups. However, the invention is not limited thereto. For example, the imaging element may include only the first pixel group and the second pixel group. A digital camera including this type of imaging element can generate a three-dimensional image (3D image) on the basis of the first image output from the first pixel group and the second image output from the second pixel group and can also generate a two-dimensional image (2D image). In this case, the two-dimensional image is generated by, for example, performing an interpolation process between the pixels of the same color in the first image and the second image. In addition, the first image or the second image may be used as the two-dimensional image, without performing the interpolation process.

In the first embodiment, in a case in which the first to third images are input to the image processing unit 28, both the normal image and the split image are displayed on the same screen of the display device at the same time. However, the invention is not limited thereto. For example, the display control unit 36 may perform control such that the continuous display of the normal images as a moving image on the display device is prevented and the split images are continuously displayed as a moving image on the display device. Here, the term "preventing the display of the normal image" means, for example, that no normal image is displayed on the display device. Specifically, the term "preventing the display of the normal image" means that the normal image is generated, but is not output and displayed on the display device or that the normal image is not generated and displayed on the display device. The entire screen of the display device may be used to display the split image. For example, the entire display region of the split image illustrated in FIG. 9 may be used to display the split image.

Various conditions are considered as the conditions for preventing the display of the normal image and displaying the split image. For example, in a case in which an instruction to display the normal image is cancelled with the display of the split image being instructed, the display control unit 36 may perform control such that the display device does not display the normal image and displays the split image. In addition, for example, in a case in which the user looks through the hybrid finder, the display control unit 36 may perform control such that the display device does not display the normal image and displays the split image. For example, in a case in which the release button 211 is in the halfway pressed state, the display control unit 36 may perform control such that the display device does not display the normal image and displays the split image. For example, in a case in which an operation of pressing the release button 211 is not performed, the display control unit 36 may perform control such that the display device does not display the normal image and displays the split image. For example, in a case in which a face detection function which detects the face of the object is performed, the display control unit 36 may perform control such that the display device does not display the normal image and displays the split image. Here, the modification example in which the display control unit 36 prevents the display of the normal image has been described. However, the invention is not limited thereto. For example, the display control unit 36 may perform control such that the entire split image is overwritten on the entire screen of the normal image.

The imaging device 100 described in the first embodiment may have a function of checking the depth of field (field depth check function). In this case, for example, the imaging device 100 has a field depth check key. The field depth check key may be a hardware key or a software key. In a case in which the hardware key is pressed to issue an instruction, it is preferable to apply a momentary switch (non-hold switch). For example, during the period for which the momentary switch is pressed at a predetermined position, a specific operation state of the imaging device 100 is maintained. Here, when the field depth check key is pressed, the diaphragm value is changed. When the field depth check key is maintained in a pressed state (the field depth check is maintained at a predetermined position), the diaphragm value changes continuously until it reaches a limit value. As such, when the field depth check key is maintained in a pressed state, the diaphragm value changes. Therefore, in some cases, the phase difference required to obtain the split image is not obtained. In a case in which the field depth check key is pressed with the split image being displayed, display may be changed from the split image to general live view display while the field depth check key is being pressed. In addition, when the pressed state is removed, the CPU 12 may switch a screen such that the split image is displayed again. Here, the momentary switch is given as an example of the field depth check key. However, the invention is not limited thereto. For example, an alternate switch (hold switch) may be applied.

Second Embodiment

In the first embodiment, the output value of the first pixel signal is compared with the output value of the second pixel signal. However, in a second embodiment, a case in which the average output value of the first pixel signal is compared with the average output value of the second pixel signal will be described. In the second embodiment, the same components as those in the first embodiment are denoted by the same reference numerals and the description thereof will not be repeated.

Figure 27:
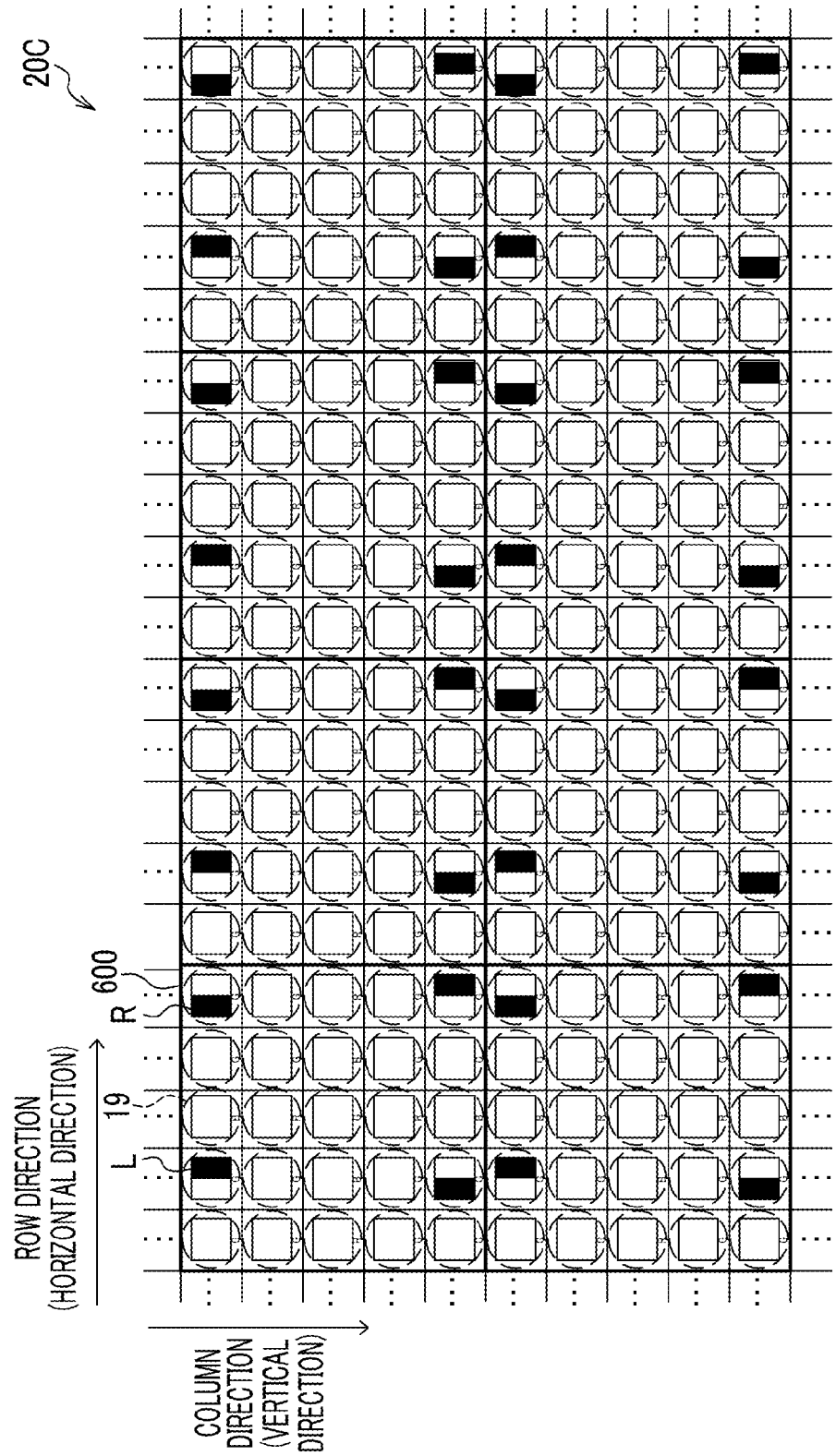
FIG. 27 is a diagram schematically illustrating an example of the arrangement of normal pixels, first pixels, and second pixels and an example of the arrangement of the colors of color filters allocated to the normal pixels, the first pixels, and the second pixels in an imaging element of an imaging device according to the second embodiment.

An imaging device 100A according to the second embodiment differs from the imaging device 100 according to the first embodiment in that it includes, for example, an imaging element 20C illustrated in FIG. 27, instead of the imaging element 20. The imaging element 20C is the same as the imaging element 20 in that the first pixels L and the second pixels R are alternately arranged in the row direction and the column direction and differs from the imaging element 20 in the pitch between the phase difference pixels in the row direction and the column direction. That is, in the imaging element 20, the phase difference pixels of the same type are arranged in the row direction and alternate every six pixels. In contrast, in the imaging element 20C, the phase difference pixels of the same type are arranged in the row direction and alternate every five pixels. In the imaging element 20, the phase difference pixels of the same type are arranged in the column direction and alternate every six pixels. In contrast, in the imaging element 20C, the phase difference pixels of the same type are arranged in the column direction and alternate every five pixels.

Figure 26:
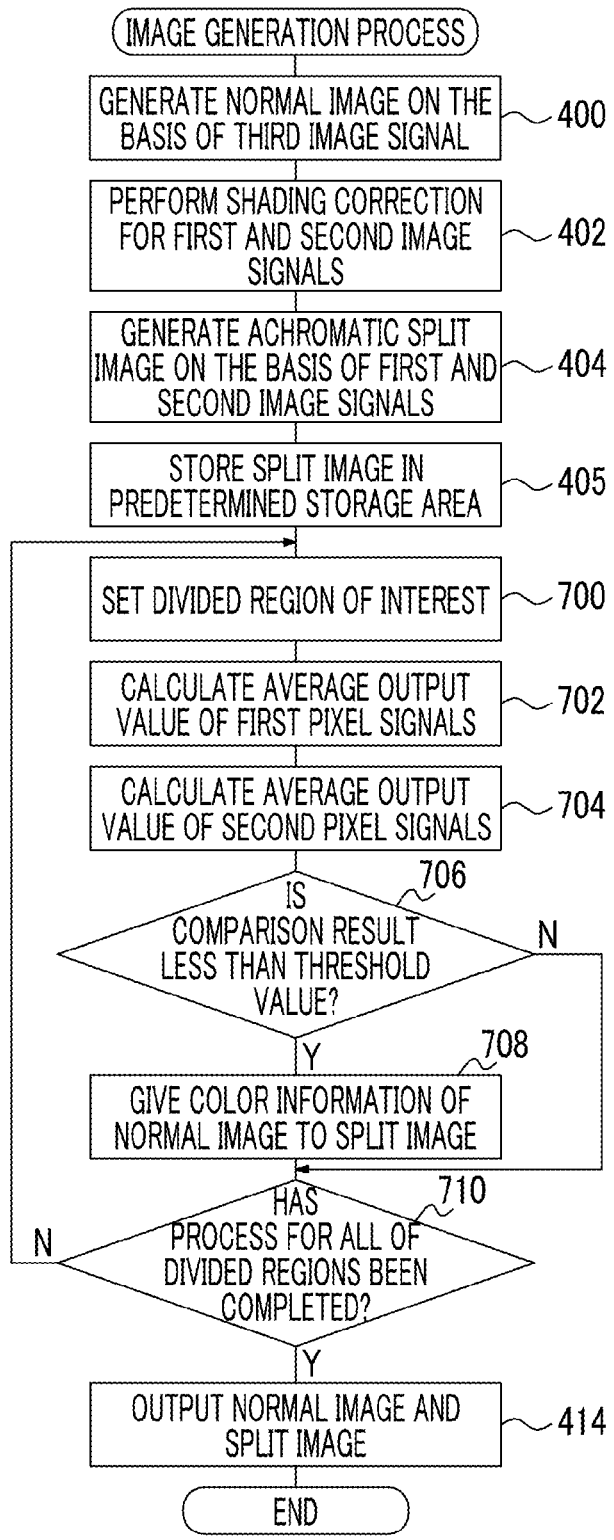
FIG. 26 is a flowchart illustrating an example of the flow of an image generation process according to the second embodiment.

The imaging device 100A according to the second embodiment differs from the imaging device 100 according to the first embodiment in that the image processing unit 28 performs an image generation process illustrated in FIG. 26, instead of the image generation process illustrated in FIG. 11. The image generation process illustrated in FIG. 26 differs from the image generation process illustrated in FIG. 11 in that it includes Steps 700 to 710, instead of Steps 406 to 412.

In the image generation process illustrated in FIG. 26, in Step 700, for example, the control unit 28C sets a divided region 600 to which attention is to be paid (hereinafter, referred to as a "divided region of interest") among a plurality of divided regions 600 obtained by dividing the imaging element 20, as illustrated in FIG. 27. Here, the "divided region of interest" indicates a divided region 600 which has not been processed in Step 702. The divided regions 600 indicate each region (regions which are surrounded by a thick solid line in the example illustrated in FIG. 27) obtained by dividing, for example, the imaging element 20 in an M×M matrix (for example, an 8×8 matrix). Here, "M" is a natural number that is equal to or greater than 2.

For example, as illustrated in FIG. 27, the divided region 600 is a pixel group in which the first pixels L, the second pixels R, and the normal pixels N are arranged in a matrix according to a predetermined rule (an example of a divided pixel group according to the invention (a 5×5 matrix in the example illustrated in FIG. 27)). The divided region 600 includes a plurality of pairs of phase difference pixels (two pairs of phase difference pixels in the example illustrated in FIG. 27). A pair of phase difference pixels included in the divided region 600 include the first pixel L and the second pixel R which are adjacent to each other in a direction perpendicular to the pupil division direction. That is, the pair of phase difference pixels are a pair of the first pixel L and the second pixel R (the first pixel L and the second pixel R adjacent to each other in the column direction) which are aligned in the row direction.

Then, in Step 702, the control unit 28C acquires the first pixel signals which are output from all of the first pixels L included in the divided region of interest set in Step 700, calculates the average output value of all of the acquired first pixel signals, and proceeds to Step 704. The first pixel signal acquired in Step 702 is the second image signal subjected to shading correction in Step 402. In the example illustrated in FIG. 27, the average output value of the first pixel signals output from two first pixels L is calculated from one divided region 600 (divided region of interest).

In Step 704, the control unit 28C acquires the second pixel signals which are output from all of the second pixels R included in the divided region of interest set in Step 700, calculates the average output value of all of the acquired second pixel signals, and proceeds to Step 706. The second pixel signal acquired in Step 704 is the second image signal subjected to shading correction in Step 402. In the example illustrated in FIG. 27, the average output value of the second pixel signals output from two second pixels R is calculated from one divided region 600 (divided region of interest).

In Step 706, the control unit 28C determines whether the result of comparison between the average output value of the first pixel signals calculated in Step 702 and the average output value of the second pixel signals calculated in Step 704 is less than a threshold value. Here, the absolute value of the difference between the average output value of the first pixel signals calculated in Step 702 and the average output value of the second pixel signals calculated in Step 704 is used as an example of the comparison result.

In a case in which it is determined in Step 706 that the result of comparison between the average output value of the first pixel signals calculated in Step 702 and the average output value of the second pixel signals calculated in Step 704 is less than the threshold value, that is, the determination result is "Yes", the process proceeds to Step 708. In a case in which it is determined in Step 706 that the result of comparison between the average output value of the first pixel signals calculated in Step 702 and the average output value of the second pixel signals calculated in Step 704 is equal to or greater than the threshold value, that is, the determination result is "No", the process proceeds to Step 710.

In Step 708, the control unit 28C gives the color information of the normal images at positions corresponding to the positions of the phase difference pixels in the first pixel signals acquired in Step 702 and the second pixel signals acquired in Step 704 to the split image stored in a predetermined storage area.

Then, in Step 710, the control unit 28C determines whether the process in Step 700 has been performed for all of the divided regions 600. In a case in which it is determined in Step 710 that the process in Step 700 has not been performed for all of the divided regions 600, that is, the determination result is "No", the process proceeds to Step 700. In a case in which it is determined in Step 710 that the process in Step 700 has been performed for all of the divided regions 600, that is, the determination result is "Yes", the process proceeds to Step 414.

As described above, in the imaging device 100A, it is determined whether the result of comparison between the average output value of the first pixel signals and the average output value of the second pixel signals is less than the threshold value in each divided region 600. Therefore, the imaging device 100A can determine whether an image is in focus with high accuracy, as compared to a case in which whether the comparison result is less than the threshold value in each divided region 600 is not performed.

In the second embodiment, it is determined whether the result of comparison between the average output value of the first pixel signals and the average output value of the second pixel signals is less than the threshold value in each divided region 600. However, the invention is not limited thereto. For example, it may be determined whether the result of comparison between the median of the output values of the first pixel signals and the median of the output values of the second pixel signals is less than the threshold value in each divided region 600. It may be determined whether the result of comparison between the mode of the output values of the first pixel signals and the mode of the output values of the second pixel signals is less than the threshold value in each divided region 600. In addition, it may be determined whether the result of comparison between the representative value of the output values of the first pixel signals and the representative value of the output values of the second pixel signals is less than the threshold value in each divided region 600. Here, the output value of the first pixel signal output from the first pixel L which is located at a specific position in the divided region 600 is given as an example of the representative value of the output values of the first pixel signals. In addition, the output value of the second pixel signal output from the second pixel R which is located at a specific position in the divided region 600 is given as an example of the representative value of the output values of the second pixel signals.

In the second embodiment, the absolute value of the difference between the average output value of the first pixel signals acquired in Step 702 and the average output value of the second pixel signals acquired in Step 704 is used as an example of the comparison result. However, the invention is not limited thereto. For example, an example of the comparison result may be the ratio of one of the average output value of the first pixel signals acquired in Step 702 and the average output value of the second pixel signals acquired in Step 704 to the other average output value. In this case, for example, it is determined whether color information is given to the split image on the basis of the degree of deviation of the ratio of one of the average output values to the other average output value from a reference value (for example, 1).

Third Embodiment

In each of the above-described embodiments, the imaging devices 100 and 100A are given as an example. However, for example, a mobile phone or a smart phone with a camera function may be given as an example of a portable terminal apparatus which is a modification example of the imaging devices 100 and 100A. In addition, for example, a personal digital assistant (PDA) or a portable game machine is given as an example of the portable terminal apparatus. In a third embodiment, the smart phone will be described in detail as an example with reference to the drawings.

Figure 28:
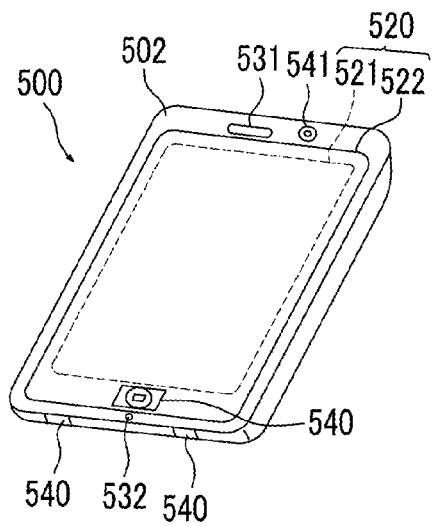
FIG. 28 is a perspective view illustrating an example of the outward appearance of a smart phone according to a third embodiment.

FIG. 28 is a perspective view illustrating an example of the outward appearance of a smart phone 500. The smart phone 500 illustrated in FIG. 28 comprises a housing 502 with a flat panel shape and a display input unit 520 having a display panel 521 as a display unit and an operation panel 522 as an input unit which are integrally formed on one surface of the housing 502. The housing 502 comprises a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding structure.

Figure 29:
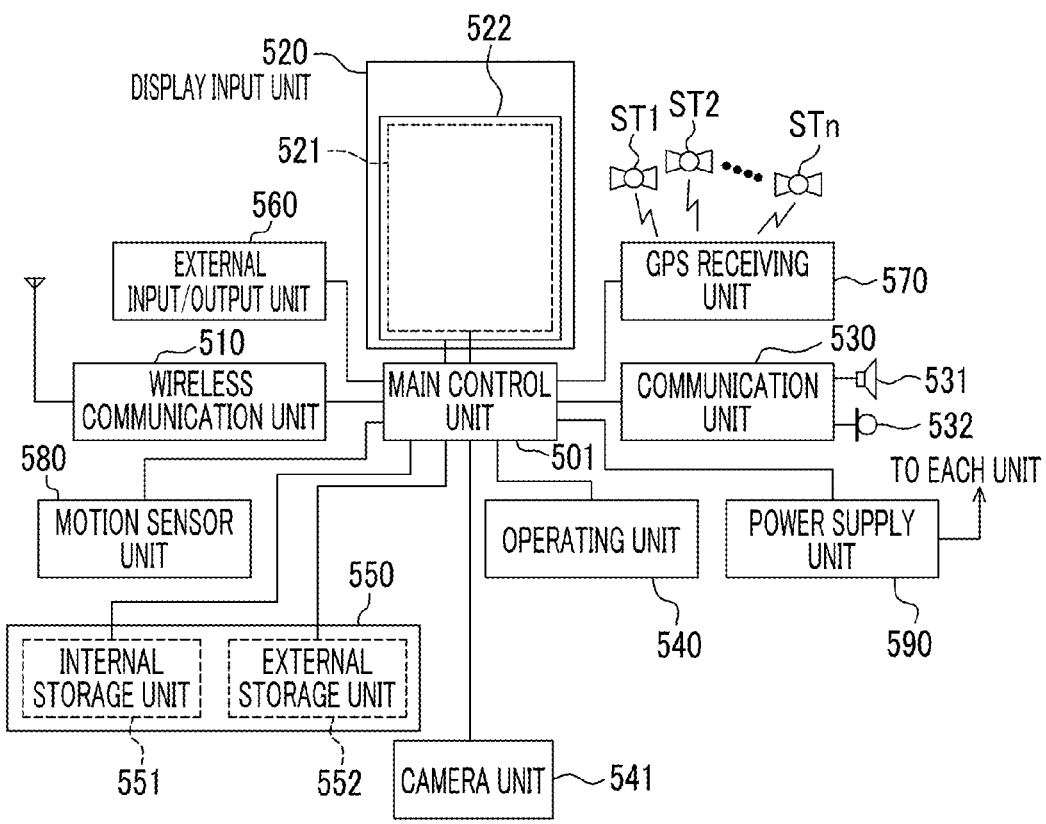
FIG. 29 is a block diagram illustrating an example of the structure of a main portion of an electrical system of the smart phone according to the third embodiment.

FIG. 29 is a block diagram illustrating an example of the structure of the smart phone 500 illustrated in FIG. 28. As illustrated in FIG. 29, the smart phone 500 comprises, as main components, a wireless communication unit 510, the display input unit 520, a communication unit 530, the operating unit 540, the camera unit 541, a storage unit 550, and an external input/output unit 560. In addition, the smart phone 500 comprises, as main components, a global positioning system (GPS) receiving unit 570, a motion sensor unit 580, a power supply unit 590, and a main control unit 501. The smart phone 500 has, as a main function, a wireless communication function which performs mobile wireless communication through a base station apparatus BS and a mobile communication network NW.

The wireless communication unit 510 performs wireless communication with the base station apparatus BS which is accommodated in the mobile communication network NW in response to an instruction from the main control unit 501. The wireless communication is used to transmit and receive various types of file data, such as voice data and image data, and electronic mail data or to receive, for example, web data and streaming data.

The display input unit 520 is a so-called touch panel and comprises the display panel 521 and the operation panel 522. Therefore, the display input unit 520 displays, for example, images (still images and moving images) or text information to visually transmit information to the user and detects the user's operation for the displayed information under the control of the main control unit 501. It is preferable that the display panel 521 is a 3D display panel in a case in which a generated 3D image is viewed.

The display panel 521 uses, for example, an LCD or an organic electro-luminescence display (OELD) as a display device. The operation panel 522 is a device that is provided such that an image displayed on a display surface of the display panel 521 is visually recognized and detects one or a plurality of coordinate points selected by a finger of the user or a stylus. When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 29, the display panel 521 and the operation panel 522 of the smart phone 500 are integrated to form the display input unit 520 and the operation panel 522 is arranged so as to completely cover the display panel 521. In a case in which this arrangement is used, the operation panel 522 may have a function of detecting the user's operation even in a region other than the display panel 521. In other words, the operation panel 522 may include a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may include two sensitive regions, that is, an outer edge portion and an inner portion other than the outer edge portion. The width of the outer edge portion is appropriately designed according to, for example, the size of the housing 502. Examples of a position detecting method which is used in the operation panel 522 include a matrix switching method, a resistive film method, a surface elastic wave method, an infrared method, an electromagnetic induction method, and a capacitive sensing method. Any of the methods may be used.

The communication unit 530 comprises the speaker 531 and the microphone 532. The communication unit 530 converts the voice of the user which is input through the microphone 532 into voice data which can be processed by the main control unit 501 and outputs the converted voice data to the main control unit 501. In addition, the communication unit 530 decodes voice data received by the wireless communication unit 510 or the external input/output unit 560 and outputs the decoded voice data from the speaker 531. As illustrated in FIG. 28, for example, the speaker 531 can be mounted on the same surface as the display input unit 520 and the microphone 532 can be mounted on a lower portion of the front surface of the housing 502.

The operating unit 540 is a hardware key which uses, for example, a key switch and receives instructions from the user. For example, as illustrated in FIG. 28, the operating unit 540 is a push button switch which is mounted on the lower portion of the front surface of the housing 502 of the smart phone 500, is turned on when it is pressed by, for example, a finger, and is turned off by the restoring force of a spring when the finger is taken off The storage unit 550 stores a control program or control data of the main control unit 501, application software, address data which is associated with, for example, the names or phone numbers of communication partners, and transmitted and received electronic mail data. In addition, the storage unit 550 stores web data which is downloaded by web browsing or downloaded content data. In addition, the storage unit 550 temporarily stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory or a hard disk. Examples of the storage medium can include a multimedia-card-micro-type memory, a card-type memory (for example, a MicroSD (registered trademark) memory), a random access memory (RAM), and a read only memory (ROM).

The external input/output unit 560 functions as an interface with all of the external apparatuses connected to the smart phone 500 and is directly or indirectly connected to other external apparatuses by communication or a network. Examples of the communication with other external apparatuses include universal serial bus (USB) communication and IEEE1394. Examples of the network include the Internet, a wireless LAN, a Bluetooth (registered trademark) network, a radio frequency identification (RFID) network, and an infrared data association (IrDA (registered trademark)) network. In addition, other examples of the network include an ultra wideband (UWB: registered trademark) network and a ZigBee (registered trademark) network.

Examples of the external apparatus connected to the smart phone 500 include a wired/wireless headset, a wired/wireless external charger, a wired/wireless data port, and a memory card which is connected through a card socket. Other examples of the external apparatus include a subscriber identity module (SIM) card/user identity module (UIM) card and an external audio/video apparatus which is connected through an audio/video input/output (I/O) terminal. In addition to the external audio/video apparatus, a wirelessly connected external audio/video apparatus may be given as an example of the external apparatus. For example, a smart phone which is connected wirelessly or in a wired manner, a personal computer which is connected wirelessly or in a wired manner, a PDA which is connected wirelessly or in a wired manner, and an earphone can be applied, instead of the external audio/video apparatus.

The external input/output unit 560 can transmit data which is received from the external apparatus to each component of the smart phone 500 or can transmit data in the smart phone 500 to the external apparatus.

The GPS receiving unit 570 receives GPS signals transmitted from GPS satellites ST1 to STn and performs a position measurement process on the basis of the received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, the wireless LAN), it can detect the position using the positional information.

The motion sensor unit 580 comprises, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 comprises a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control for detecting the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540 or to receive an operation for the icon or the input of a character string to an input field of the window through the operation panel 522. In addition, the main control unit 501 performs the operation detection control to receive a request to scroll the displayed image through the scroll bar.

In addition, the main control unit 501 performs the operation detection control to determine whether the position of an operation for the operation panel 522 is an overlap portion (display region) which overlaps the display panel 521 or an outer edge portion (non-display region) which does not overlap the display panel 521 other than the overlap portion. The main control unit 501 has a touch panel control function that receives the determination result and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a CMOS or a CCD, and has the same functions as the imaging device 100 illustrated in FIG. 1.

The camera unit 541 can switch the operation mode between the manual focus mode and the automatic focus mode. When the manual focus mode is selected, the user can operate, for example, a focus icon button displayed on the operating unit 540 or the display input unit 520 to focus the imaging lens of the camera unit 541. In the manual focus mode, a live view image having a split image combined therewith is displayed on the display panel 521 such that the user can check a focus state in the manual focus mode. In addition, the hybrid finder 220 illustrated in FIG. 10 may be provided in the smart phone 500.

The camera unit 541 converts captured image data into image data which is compressed in, for example, a joint photographic coding experts group (JPEG) format under the control of the main control unit 501. Then, the camera unit 541 records the converted image data in the storage unit 550 or outputs the converted image data through the external input/output unit 560 or the wireless communication unit 510. As illustrated in FIG. 29, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. In a case in which a plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

For example, various kinds of information may be added to the image data of a still image or a moving image and the image data may be stored in the storage unit 550 or may be output through the external input/output unit 560 or the wireless communication unit 510. The "various kinds of information" include the positional information which is acquired by the GPS receiving unit 570 and the voice information which is acquired by the microphone 532 (for example, the main control unit may convert the voice information into text information using voice-text conversion). In addition, the "various kinds of information" include, for example, the posture information which is acquired by the motion sensor unit 580.

Figure 30:
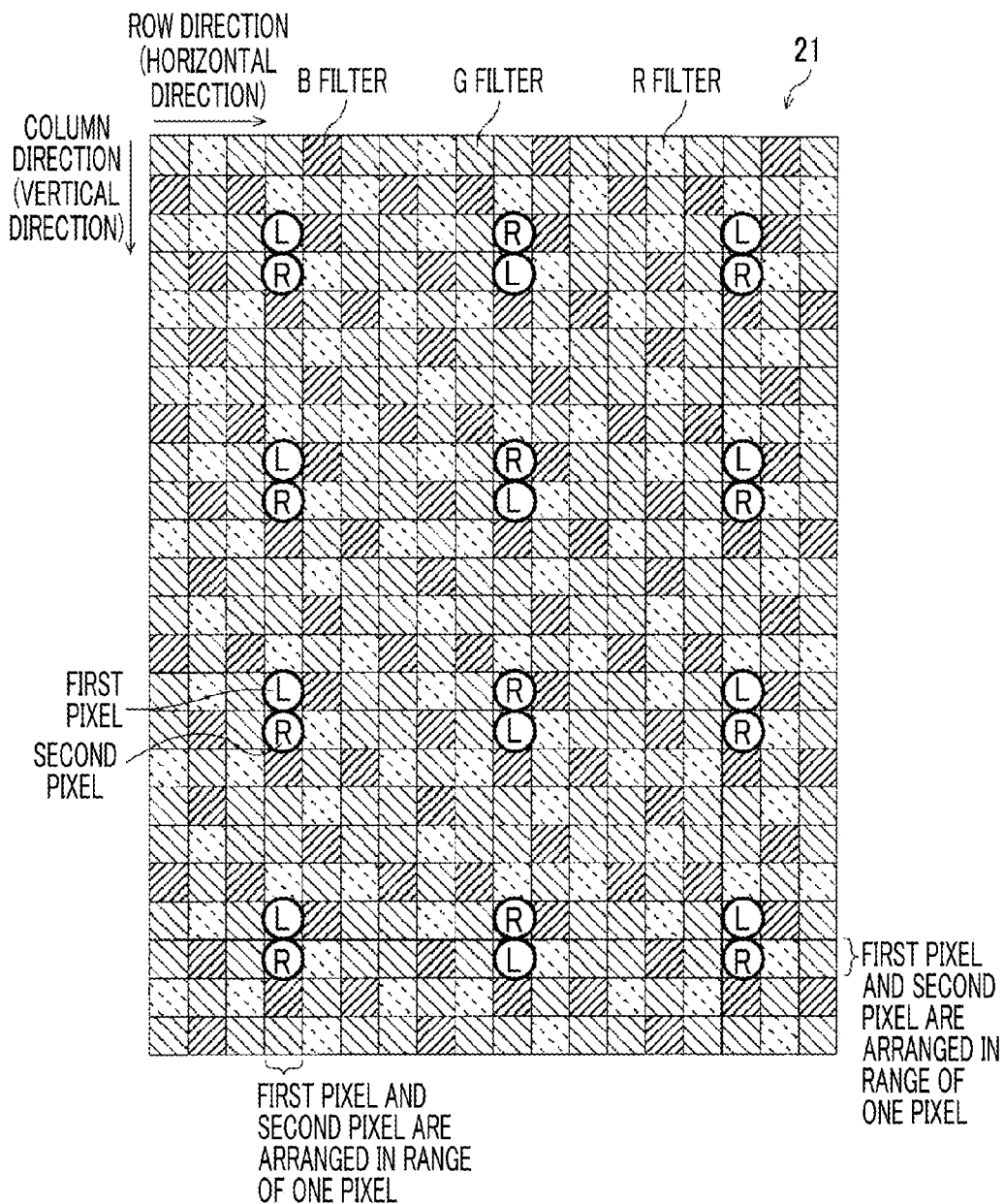
FIG. 30 is a diagram schematically another example of the arrangement of the first pixels and the second pixels.

In each of the above-described embodiments, the first pixels L and the second pixels R are alternately arranged in the row direction and the column direction at intervals of a predetermined number of pixels. However, the invention is not limited thereto. For example, as illustrated in FIG. 30, the first pixel L and the second pixel R may be alternately arranged in the row direction at intervals of a predetermined number of pixels and the first pixel L and the second pixel R which are adjacent to each other may be arranged in the column direction at intervals of a predetermined number of pixels. In this case, it is preferable that the positions of the first pixel L and the second pixel R are aligned within a predetermined number of pixels in at least one of the column direction or the row direction between the first pixel group and the second pixel group. In the example illustrated in FIG. 30, the positions of the first pixel L and the second pixel R are aligned with each other within the range of one pixel in the column direction and the row direction between the first pixel group and the second pixel group.

Figure 31:
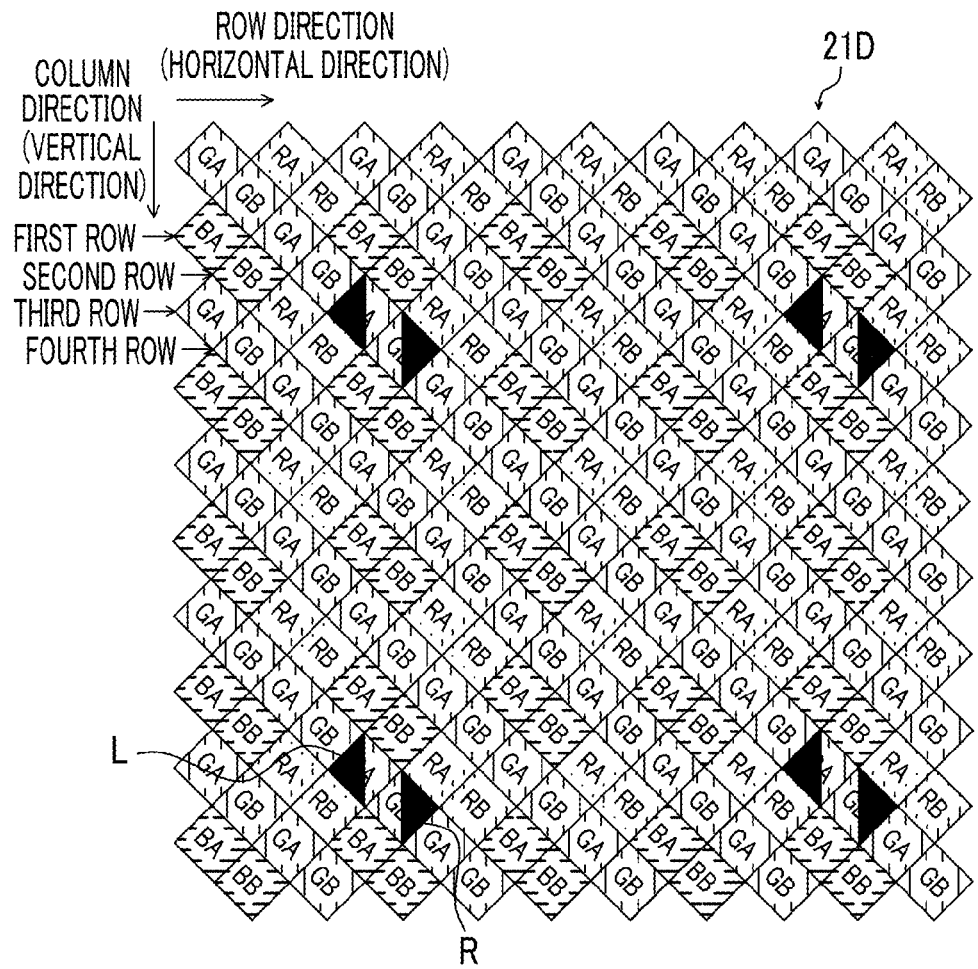
FIG. 31 is a diagram schematically illustrating another example of the structure of the color filters.

In each of the above-described embodiments, the color filter 21 (see FIG. 4) in which the primary colors (an R filter, a G filter, and a B filter) are arranged in a Bayer array is given as an example. However, the invention is not limited thereto. For example, a color filter 21D illustrated in FIG. 31 may be used instead of the color filter 21. FIG. 31 schematically illustrates an example of the array of the primary colors (an R filter, a G filter, and a B filter) of the color filter 21D and the arrangement of light shielding members. In the color filter 21D illustrated in FIG. 31, first to fourth rows are repeatedly arranged in the column direction. The first row means a row in which the B filter and the G filter are alternately arranged in the row direction. The second row means a row which is shifted from the first row by a half pitch (a distance corresponding to half of the pixel) in the row direction. The third row means a row in which the G filter and the R filter are alternately arranged in the row direction. The fourth row means a row which is shifted from the third row by a half pitch in the row direction.

The first row and the second row are adjacent to each other so as to be shifted by a half pitch in the column direction. The second row and the third row are adjacent to each other so as to be shifted by a half pitch in the column direction. The third row and the fourth row are adjacent to each other so as to be shifted by a half pitch in the column direction. The fourth row and the first row are adjacent to each other so as to be shifted by a half pitch in the column direction. Therefore, the first to fourth rows repeatedly appear every two pixels in the column direction.

For example, as illustrated in FIG. 31, the first pixel L and the second pixel R are allocated to the third and fourth rows, respectively. That is, the first pixel L is allocated to the third row and the second pixel R is allocated to the fourth row. The first pixel L and the second pixel R are arranged adjacent to each other (at the minimum pitch) and form a pair. In addition, in the example illustrated in FIG. 31, the first pixel L is allocated to every six pixels in the row direction and the column direction and the second pixel R is allocated to every six pixels in the row direction and the column direction.

In the example illustrated in FIG. 31, the G filter is allocated to the first pixel L and the second pixel R. Since the pixel provided with the G filter has a higher sensitivity than pixels provided with the filters of the other colors, it is possible to improve the accuracy of interpolation. In addition, since the G filters are continuously arranged as compared to the filters of the other colors, the pixels having the G filters allocated thereto are easier to interpolate than the pixels having the filters of the other colors allocated thereto.

In each of the above-described embodiments, the split image is divided into four images in the up-down direction. However, the invention is not limited thereto. The split image may be divided into a plurality of images in the left-right direction or the oblique direction.

Figure 32:
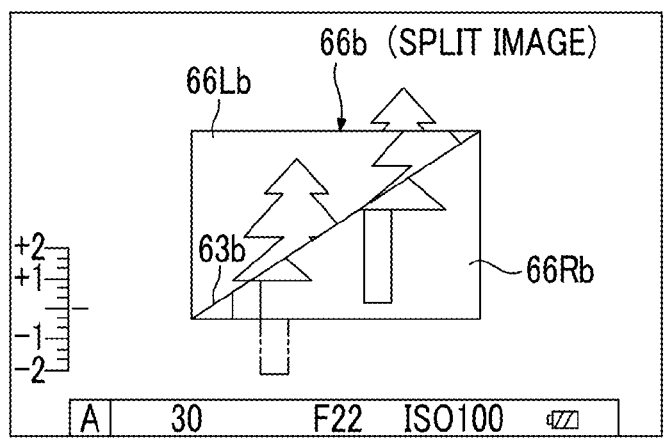
FIG. 32 is a diagram schematically illustrating a modification example of the split image according to the first to third embodiments which is divided by an oblique boundary line that is inclined with respect to a row direction.

For example, a split image 66*b* illustrated in FIG. 32 is divided into two images by a boundary line 63*b* (for example, a diagonal line of the split image 66*b*) which has an angle of inclination in the row direction. In the split image 66*b*, a phase difference image 66Lb which is generated on the basis of an output signal from the first pixel group is displayed in one region. In addition, a phase difference image 66Rb which is generated on the basis of an output signal from the second pixel group is displayed in the other region.

Figure 33A:
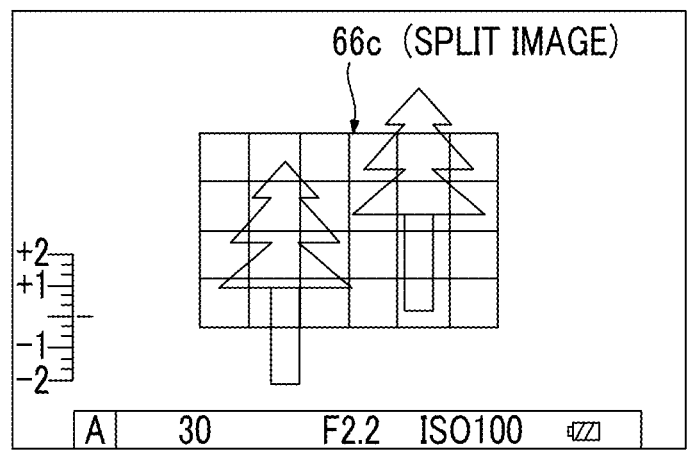
FIG. 33A is a diagram schematically illustrating a modification example of the split image according to the first to third embodiments which is divided by lattice-shaped boundary lines.
Figure 33B:
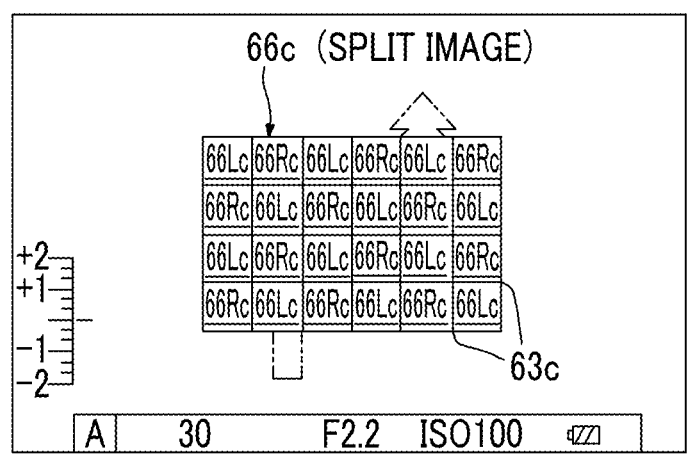
FIG. 33B is a diagram schematically illustrating a modification example of the split image according to the first to third embodiments which is formed in a checkered pattern.

A split image 66*c* illustrated in FIGS. 33A and 33B is divided by lattice-shaped boundary lines 63*c* which are parallel in the row direction and the column direction. In the split image 66*c*, phase difference images 66Lc which are generated on the basis of an output signal from the first pixel group are arranged in a checkered pattern and then displayed. In addition, phase difference images 66Rc which are generated on the basis of an output signal from the second pixel group are arranged in a checkered pattern and then displayed.

The split image is not limited thereto. A different focus check image may be generated from two phase difference images and then displayed. For example, two phase difference images may be superimposed and a composite image may be displayed. In a case in which an image is out of focus, the image may be displayed as a double image. In a state in which the image is in focus, the image may be clearly displayed.

EXPLANATION OF REFERENCES

16: imaging lens
20, 20C: imaging element
28A: normal image generation unit
28B: split image generation unit
28C: control unit
36: display control unit
100, 100A: imaging device
215: first display
247: second display

What is claimed is:
1. An image processing device comprising:
a generation unit that generates a first achromatic image based on a first image signal which is output from an imaging element including first and second pixel groups on which an object image that passes through first and second regions of an imaging lens and is pupil-divided is formed and which output the first image signal and a second image signal, respectively, and a third pixel group on which the object image that passes through the imaging lens and is formed, without being pupil-divided, and which outputs a third image signal, a second achromatic image based on the second image signal that is output from the imaging element, and a third chromatic image based on the third image signal that is output from the imaging element;

a display unit that displays an image; and a control unit that performs control such that the display unit displays a chromatic image, which is obtained by giving a chromatic color included in the third image at a position corresponding to the first pixel to a position of the first pixel in the first image and giving a chromatic color included in the third image at a position corresponding to the second pixel to a position of the second pixel in the second image and is used to check a focus, in a case in which a result of comparison between an output value of the first image signal output from a first pixel included in the first pixel group and an output value of the second image signal output from a second pixel corresponding to the first pixel and included in the second pixel group is less than a threshold value and performs control such that the display unit displays an achromatic image, which is obtained on the basis of the first image at a position corresponding to the first pixel and the second image at a position corresponding to the second pixel and is used to check a focus, in a case in which the comparison result is equal to or greater than the threshold value.

2. The image processing device according to claim 1, wherein the control unit performs control such that the display unit displays the third image and selectively displays the chromatic image and the achromatic image in a display region of the third image.

3. The image processing device according to claim 1, wherein the comparison result is a value that is based on at least one of a difference or a ratio between the output value of the first image signal and the output value of the second image signal.

4. The image processing device according to claim 2, wherein the comparison result is a value that is based on at least one of a difference or a ratio between the output value of the first image signal and the output value of the second image signal.

5. The image processing device according to claim 3, wherein the comparison result is an absolute value of the difference.

6. The image processing device according to claim 3, wherein the comparison result is a value obtained by normalizing an absolute value of the difference.

7. The image processing device according to claim 3, wherein the comparison result is a degree of deviation of a ratio of one of the output value of the first image signal and the output value of the second image signal to the other output value from a reference value.

8. The image processing device according to claim 1, wherein the threshold value is determined according to imaging conditions.

9. The image processing device according to claim 8, wherein the imaging conditions are a diaphragm value, and
the threshold value decreases as the diaphragm value decreases.

10. The image processing device according to claim 8, wherein the imaging conditions are a focal length, and the threshold value decreases as the focal length increases.

11. The image processing device according to claim 8, wherein the imaging conditions are an exposure time, and the threshold value decreases as the exposure time increases.

12. The image processing device according to claim 8, wherein the imaging conditions are the gain of the imaging element, and
the threshold value decreases as the gain increases.

13. The image processing device according to claim 1, wherein the comparison result is a result of comparison between the output value of the first image signal and the output value of the second image signal, of which shading characteristics have been corrected on the basis of a correction coefficient corresponding to the shading characteristics based on light that is incident through the first region and light that is incident through the second region.

14. The image processing device according to claim 1, wherein the comparison result is a result of comparison between the output value of the first image signal and the output value of the second image signal, which are output from the first pixel and the second pixel that are arranged in a direction intersecting a pupil division direction.

15. The image processing device according to claim 1, wherein the comparison result is a result of comparison between the output value of the first image signal output from the first pixel included in the first pixel group and the output value of the second image signal output from the second pixel corresponding to the first pixel and included in the second pixel group in each of a plurality of divided pixel groups obtained by dividing a pixel group including the first and second pixel groups.

16. The image processing device according to claim 1, wherein the control unit performs control such that chroma is given from the third image at a position corresponding to the first pixel to a position of the first pixel in the first image and chroma is given from the third image at a position corresponding to the second pixel to a position of the second pixel in the second image to thereby give a chromatic color to the first and second images in a case in which the comparison result is less than the threshold value.

17. The image processing device according to claim 1, wherein the intensity of the chromatic color which is given to the first and second images in a case in which the comparison result is less than the threshold value increases as the degree of deviation of the comparison result from the threshold value increases.

18. An imaging device comprising:
the image processing device according to claim 1;
an imaging element including the first pixel group, the second pixel group, and the third pixel group; and
a storage unit that stores an image which is generated on the basis of a signal output from the imaging element.

19. An image processing method comprising:
providing the image processing device according to claim 1;
generating the first achromatic image based on the first image signal which is output from the imaging element including first and second pixel groups on which the object image that passes through first and second regions of the imaging lens and is pupil-divided is formed and which output the first image signal and the second image signal, respectively, and the third pixel group on which the object image that passes through the imaging lens and is formed, without being pupil-divided, and which outputs the third image signal, the second achromatic image based on the second image signal that is output from the imaging element, and the third chromatic image based on the third image signal that is output from the imaging element; and performing control such that the display unit which displays the image displays the chromatic image, which is obtained by giving the chromatic color included in the third image at the position corresponding to the first pixel to the position of the first pixel in the first image and giving the chromatic color included in the third image at the position corresponding to the second pixel to the position of the second pixel in the second image and is used to check the focus, in the case in which the result of comparison between the output value of the first image signal output from the first pixel included in the first pixel group and the output value of the second image signal output from the second pixel corresponding to the first pixel and included in the second pixel group is less than the threshold value and performing control such that the display unit displays the achromatic image, which is obtained on the basis of the first image at the position corresponding to the first pixel and the second image at the position corresponding to the second pixel and is used to check the focus, in the case in which the comparison result is equal to or greater than the threshold value.

20. A non-transitory computer readable recording medium recorded with an image processing program that causes a computer to perform a process for functioning as the image processing device according to claim 1 comprising:

generating the first achromatic image based on the first image signal which is output from the imaging element including first and second pixel groups on which the object image that passes through first and second regions of the imaging lens and is pupil-divided is formed and which output the first image signal and the second image signal, respectively, and the third pixel group on which the object image that passes through the imaging lens and is formed, without being pupil-divided, and which outputs the third image signal, the second achromatic image based on the second image signal that is output from the imaging element, and the third chromatic image based on the third image signal that is output from the imaging element; and performing control such that the display unit which displays the image displays the chromatic image, which is obtained by giving the chromatic color included in the third image at the position corresponding to the first pixel to the position of the first pixel in the first image and giving the chromatic color included in the third image at the position corresponding to the second pixel to the position of the second pixel in the second image and is used to check the focus, in the case in which the result of comparison between the output value of the first image signal output from the first pixel included in the first pixel group and the output value of the second image signal output from the second pixel corresponding to the first pixel and included in the second pixel group is less than the threshold value and performing control such that the display unit displays the achromatic image, which is obtained on the basis of the first image at the position corresponding to the first pixel and the second image at the position corresponding to the second pixel and is used to check the focus, in the case in which the comparison result is equal to or greater than the threshold value.

* * * * *